US012812648B2

(12) United States Patent
Su et al.

(10) Patent No.: US 12,812,648 B2
(45) Date of Patent: Nov. 24, 2026

(54) DETERMINING WHETHER UPLINK TRANSMISSION IS CONFIGURED FOR PUSCH REPETITION OR TBoMS

(71) Applicant: Telefonaktiebolaget LM Ericsson (publ), Stockholm (SE)

(72) Inventors: Ling Su, Beijing (CN); Zhipeng Lin, Nanjing (CN); Robert Mark Harrison, Grapevine, TX (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 229 days.

(21) Appl. No.: 18/686,727

(22) PCT Filed: Jun. 15, 2022

(86) PCT No.: PCT/SE2022/050587

§ 371 (c)(1),
(2) Date: Feb. 26, 2024

(87) PCT Pub. No.: WO2023/055265

PCT Pub. Date: Apr. 6, 2023

(65) Prior Publication Data

US 2024/0381364 A1 Nov. 14, 2024

Related U.S. Application Data

(60) Provisional application No. 63/251,258, filed on Oct. 1, 2021.

(51) Int. Cl.
*H04W 72/21* (2023.01)
*H04W 72/0446* (2023.01)

(52) U.S. Cl.
CPC ....... *H04W 72/21* (2023.01); *H04W 72/0446* (2013.01)

(58) Field of Classification Search
CPC .......................... H04W 72/21; H04W 72/0446; H04L 1/1864; H04L 1/1893; H04L 1/08
See application file for complete search history.

(56) References Cited

U.S. PATENT DOCUMENTS

2022/0304035 A1* 9/2022 Zhang .................. H04W 72/23
2023/0319813 A1* 10/2023 Yao ...................... H04L 1/1864 370/329

(Continued)

OTHER PUBLICATIONS

Samsung, "TB processing over multi-slot PUSCH", 3GPP TSG RAN WG1 (Discussion) Meeting #105-e, e-Meeting, May 10-27, 2021, pp. 1-8, R1-2105326, 3GPP.

(Continued)

*Primary Examiner* — Ricky Q Ngo
*Assistant Examiner* — Kabir U Jahangir
(74) *Attorney, Agent, or Firm* — COATS & BENNETT, PLLC

(57) ABSTRACT

The present disclosure generally relates to the field of wireless communication and, more particularly, to techniques for enabling uplink scheduling. According to one aspect, there is provided a method, implemented in a wireless device, the method comprising determining whether an uplink transmission is for Physical Uplink Shared Channel (PUSCH) repetition or Transport Block processing over Multi-Slot PUSCH (TBoMS) based on a field in a Time Domain Resource Allocation (TDRA) list, and transmitting the uplink transmission in accordance with the determination.

19 Claims, 22 Drawing Sheets

(56) References Cited

U.S. PATENT DOCUMENTS

| | | | | |
|---|---|---|---|---|
| 2024/0155575 | A1* | 5/2024 | Deng | H04W 72/0446 |
| 2024/0179688 | A1* | 5/2024 | Echigo | H04W 72/0446 |
| 2024/0179692 | A1* | 5/2024 | Xiong | H04W 72/0446 |

OTHER PUBLICATIONS

Nokia, Transport block processing for PUSCH coverage enhancements, 3GPP TSG RAN WG1 (Discussion and Decision) Meeting #105-e, e-Meeting, Aug. 16-27, 2021, pp. 1-10, R1-2106656, 3GPP.

Ericsson, "TB Processing over Multi-Slot PUSCH", 3GPP TSG-RAN WG1 (Agenda Item 8.8.1.2), Meeting #106-e, e-Meeting, Aug. 16-27, 2021, pp. 1-20, R1-2107560, 3GPP.

Nokia, Final FL summary of TB processing over multi-slot PUSCH (AI 8.8.1.2), 3GPP TSG RAN WG1 (Discussion and Decision) Meeting #106-2, e-Meeting, Aug. 16-27, 2021, pp. 1-152, R1-2108545, 3GPP.

3rd Generation Partnership Project, "Technical Specification Group Radio Access Network; NR; Radio Resource Control (RRC) protocol specification (Release 16)", 3GPP TS 38.331 v16.5.0, Jun. 2021, pp. 1-959.

3rd Generation Partnership Project, "Technical Specification Group Radio Access Network; NR; Physical layer procedures for data (Release 16)", 3GPP TS 38.214 v16.7.0, Sep. 2021, pp. 1-63.

3rd Generation Partnership Project, "Technical Specification Group Radio Access Network; NR; Physical layer procedures for control (Release 16)", 3GPP TS 38.213 v16.7.0, Sep. 2021, pp. 1-168.

* cited by examiner

```
PUSCH-Allocation-r17 ::=  SEQUENCE {
     mappingType-r17          ENUMERATED {typeA, typeB}
          OPTIONAL, -- Cond NotFormat01-02-Or-TypeA
     startSymbolAndLength-r17 INTEGER (0..127)
          OPTIONAL, -- Cond NotFormat01-02-Or-TypeA
     numberOfRepetitions-r17  ENUMERATED {n1, n2, n3, n4, n7, n8, n12, n16, n20, n32}
          OPTIONAL, -- Cond Format01-02
     numberOfSlotsTBoMS-r17 ENUMERATED {n1, n2, n4, n8}
          OPTIONAL, -- Cond TBoMS
     ...
}
```

FIG. 6

```
PUSCH-Allocation-r17 ::= SEQUENCE {
     mappingType-r17          ENUMERATED {typeA, typeB}     OPTIONAL,
     startSymbolAndLength-r17 INTEGER (0..127)              OPTIONAL,
     numberOfRepetitions-r17  ENUMERATED
          {n1, n2, n3, n4, n7, n8, n12, n16, n20, n24, n28, n32} OPTIONAL,
     numberOfSlotsTBoMS-r17   ENUMERATED {n1, n2, n4, n8}   OPTIONAL,
     ...
}
```

FIG. 7

```
pusch-TimeDomainAllocationListDCI-0-1-r17 SetupRelease {
     PUSCH-TimeDomainResourceAllocationList-r17
}
pusch-TimeDomainAllocationListDCI-0-2-r17 SetupRelease {
     PUSCH-TimeDomainResourceAllocationList-r17
}
```

FIG. 8

```
PUSCH-Allocation-r17 ::= SEQUENCE {
    mappingType-r17          ENUMERATED {typeA, typeB} OPTIONAL,
    startSymbolAndLength-r17 INTEGER (0..127) OPTIONAL,
    numberOfRepetitions-r17  ENUMERATED
        {n1, n2, n3, n4, n7, n8, n12, n16, n20, n24, n28, n32} OPTIONAL,
    numberOfSlotsTBoMS-r17   ENUMERATED {n2, n4, n8} OPTIONAL, -- Cond TBoMS
    ...
}
```

FIG. 9

```
pusch-TimeDomainAllocationListDCI-0-1-r17 SetupRelease {
     PUSCH-TimeDomainResourceAllocationList-r17
}
pusch-TimeDomainAllocationListDCI-0-2-r17 SetupRelease {
     PUSCH-TimeDomainResourceAllocationList-r17
}
pusch-TimeDomainAllocationListTBoMS SetupRelease {
     PUSCH-TimeDomainResourceAllocationList-r17
}
```

FIG. 10

```
pusch-TimeDomainAllocationList SetupRelease {
     PUSCH-TimeDomainResourceAllocationList
}

pusch-TimeDomainAllocationListDCI-0-1-r16 SetupRelease {
     PUSCH-TimeDomainResourceAllocationList-r16
}

pusch-TimeDomainAllocationListDCI-0-2-r16 SetupRelease {
     PUSCH-TimeDomainResourceAllocationList-r16
}

pusch-TimeDomainAllocationListForMultiPUSCH-r16 SetupRelease {
     PUSCH-TimeDomainResourceAllocationList-r16
}
```

FIG. 11

Applicable PUSCH time domain resource allocation for DCI format 0_1 in UE specific search space scrambled with C-RNTI, MCS-C-CRNTI, CS-RNTI or SP-CSI-RNTI

| pusch-ConfigCommon includes pusch-TimeDomainAllocationList? | pusch-Config includes pusch-TimeDomainAllocationList? | pusch-Config includes pusch-TimeDomainAllocationListDCI-0-1? | pusch-Config includes pusch-TimeDomainAllocationList-ForMultiPUSCH? | pusch-Config includes pusch-TimeDomainAllocationListDCI-0-1-r17? | PUSCH time domain resource allocation to apply |
|---|---|---|---|---|---|
| NO | NO | NO | NO | NO | Default A |
| YES | NO | NO | NO | NO | pusch-TimeDomainAllocationList provided in pusch-ConfigCommon |
| NO/YES | YES | NO | NO | NO | pusch-TimeDomainAllocationList provided in pusch-Config |
| NO/YES | NO/YES | YES | - | NO | pusch-TimeDomainAllocationListDCI-0-1 provided in pusch-Config |
| NO/YES | NO/YES | - | YES | NO | pusch-TimeDomainAllocationList-ForMultiPUSCH provided in pusch-Config |
| NO/YES | NO/YES | NO/YES | - | YES | pusch-TimeDomainAllocationListDCI-0-1-r17 provided in pusch-Config |

FIG. 12

Applicable PUSCH time domain resource allocation for DCI format 0_1 in UE specific search space scrambled with C-RNTI, MCS-C-CRNTI, CS-RNTI or SP-CSI-RNTI

| pusch-ConfigCommon includes pusch-TimeDomainAllocationList? | pusch-Config includes pusch-TimeDomainAllocationList? | pusch-Config includes pusch-TimeDomainAllocationListDCI-0-1? | pusch-Config includes pusch-TimeDomainAllocationList-ForMultiPUSCH? | pusch-Config includes pusch-TimeDomainAllocationListDCI-0-1-r17? | pusch-Config includes pusch-TimeDomainAllocationListTBoMS? | PUSCH time domain resource allocation to apply |
|---|---|---|---|---|---|---|
| NO | NO | NO | NO | NO | NO | Default A |
| YES | NO | NO | NO | NO | NO | pusch-TimeDomainAllocationList provided in pusch-ConfigCommon |
| NO/YES | YES | NO | NO | NO | NO | pusch-TimeDomainAllocationList provided in pusch-Config |
| NO/YES | NO/YES | YES | - | NO | NO | pusch-TimeDomainAllocationListDCI-0-1 provided in pusch-Config |
| NO/YES | NO/YES | - | YES | NO | NO | pusch-TimeDomainAllocationList-ForMultiPUSCH in pusch-Config |
| NO/YES | NO/YES | NO/YES | - | YES | YES | pusch-TimeDomainAllocationListDCI-0-1-r17 in pusch-Config |
| NO/YES | NO/YES | NO/YES | - | - | - | pusch-TimeDomainAllocationListTBoMS provided in pusch-Config |

FIG. 13

Applicable PUSCH time domain resource allocation for DCI format 0_2 in UE specific search space scrambled with C-RNTI, MCS-C-RNTI, CS-RNTI or SP-CSI-RNTI

| pusch-ConfigCommon includes pusch-TimeDomain AllocationList? | pusch-Config includes pusch-TimeDomain Allocation List? | pusch-Config includes pusch-TimeDomain AllocationList DCI-0-2? | pusch-TimeDomain AllocationList DCI-0-2-r17? | PUSCH time domain resource allocation to apply |
|---|---|---|---|---|
| NO | NO | NO | NO | Default A |
| YES | NO | NO | NO | pusch-TimeDomainAllocationList provided in pusch-ConfigCommon |
| NO/YES | YES | NO | NO | pusch-TimeDomainAllocationList provided in pusch-Config |
| NO/YES | NO/YES | YES | NO | pusch-TimeDomainAllocationListDCI-0-2 provided in pusch-Config |
| NO/YES | NO/YES | NO/YES | YES | Pusch-timeDomainAllocationListDCI-0-2-r17 provided in pusch-Config |

FIG. 14

Applicable PUSCH time domain resource allocation for DCI format 0_2 in UE specific search space scrambled with C-RNTI, MCS-C-RNTI, CS-RNTI or SP-CSI-RNTI

| pusch-ConfigCommon includes pusch-TimeDomain AllocationList? | pusch-Config includes pusch-TimeDomain Allocation List? | pusch-Config includes pusch-TimeDomain AllocationList DCI-0-2? | pusch-Config includes pusch-TimeDomain AllocationList DCI-0-2-r17? | pusch-Config includes pusch-TimeDomain AllocationList TBoMS? | PUSCH time domain resource allocation to apply |
|---|---|---|---|---|---|
| NO | NO | NO | NO | NO | Default A |
| YES | NO | NO | NO | NO | pusch-TimeDomainAllocationList provided in pusch-ConfigCommon |
| NO/YES | YES | NO | NO | NO | pusch-TimeDomainAllocationList provided in pusch-Config |
| NO/YES | NO/YES | YES | NO | NO | pusch-TimeDomainAllocationListDCI-0-2 provided in pusch-Config |
| NO/YES | NO/YES | NO/YES | YES | - | pusch-timeDomainAllocationListDCI-0-2-r17 provided in pusch-Config |
| NO/YES | NO/YES | NO/YES | - | YES | pusch-TimeDomainAllocationListTBoMS provided in pusch-Config |

FIG. 15

DETERMINING WHETHER UPLINK TRANSMISSION IS CONFIGURED FOR PUSCH REPETITION OR TBoMS

TECHNICAL FIELD

The present disclosure generally relates to the field of wireless communication and, more particularly, to techniques for enabling uplink scheduling.

BACKGROUND

The Third Generation Partnership Project (3GPP) is a telecommunications standards organization that is developing several technologies relating to wireless communication, including radio access, core network implementation, and service capabilities. Among the standards being developed are standards pertaining to New Radio (NR). NR is a radio access technology (RAT) developed for fifth generation (5G) mobile networks.

The NR standard has evolved over time. For example, in NR Releases 15 and 16 (Rel-15/16), a Physical Uplink Shared Channel (PUSCH) transport block is not permitted to span slot boundaries. This is often referred to as a "single-slot transport block". To avoid transmitting a long PUSCH transport block across a slot boundary, the user equipment (UE) can transmit smaller transport blocks on the PUSCH in repetitions that occur in respective single slots. This is traditionally referred to as PUSCH repetition type A.

PUSCH repetition type B was introduced in NR Rel-16. PUSCH repetition type B reduces the time gap between repetitions by allowing more than one repetition per slot. Notwithstanding, transport blocks are not permitted to span a slot boundary under PUSCH repetition type A or B. In PUSCH repetition type B, a network node signals to a User Equipment (UE) which time domain resource is the first repetition and the resources for the remaining repetitions (if any) are derived by the UE from parameters in a Time Domain Resource Assignment (TDRA) table. The parameter numberOfRepetitions in particular may be configured as n1, n2, n3, n4, n7, n8, n12, or n16, with the value n1 indicating that there are no PUSCH repetitions.

Certain improvements to PUSCH repetition type A have been introduced in NR Rel-17. In NR Rel-15/16, PUSCH repetition Type A on a set of symbols may be dropped if it conflicts with a Time-Division Duplexing (TDD) uplink/downlink configuration or may be cancelled according to a cancellation indication or intra-UE priority rules. Accordingly, fewer actual repetitions than the configured number of PUSCH repetitions may occur under PUSCH repetition Type A. Notwithstanding, PUSCH repetition Type A is improved in Rel-17 in at least two noteworthy ways. Firstly, the maximum number of repetitions is increased to 32. Secondly, PUSCH repetition Type A can be based on the number of available slots.

For NR Rel-17, a new mechanism involving repetitions known as Transport Block processing over Multi-Slot PUSCH (TBoMS) was proposed as a candidate solution to provide coverage enhancement of the PUSCH. TBoMS is a mechanism that is separate from the above-discussed PUSCH repetition techniques, and it is expected that many devices will support both. In contrast to the above-discussed PUSCH repetition techniques in which one uplink transport block is confined to the uplink symbols in a single slot, TBoMS extends the time domain resource for the transmission of a transport block across the slot border to increase total power for transmission of a transport block as compared to transport block transmission in a single slot. TBoMS also reduces Cyclic Redundancy Check (CRC) overhead in the slots (except the last slot of the transport block) as compared to PUSCH repetition techniques in time domain.

SUMMARY

Embodiments of the present disclosure are generally directed to determining whether a TDRA table is for transmitting on an uplink using PUSCH repetition or TBoMS (or enabling a wireless device to do so). Various embodiments are particularly concerned with enabling a wireless device to flexibly make use of either scheme in an environment where both PUSCH repetition and TBoMS are supported. Some such embodiments provide reduced signaling overhead and/or a dynamic indication of certain information as compared to other approaches to supporting TBoMS in modern networks.

According to one aspect, a method implemented by a wireless device is provided. The method includes determining whether an uplink transmission is for PUSCH repetition or TBoMS. The determination is based on a field in a TDRA list. The method further includes transmitting the uplink transmission in accordance with the determination.

According to another aspect, a wireless device is provided. The wireless device may include processing circuitry and memory circuitry, the memory circuitry containing instructions executable by the processing circuitry. The wireless device is configured to determine whether an uplink transmission is for PUSCH repetition or TBoMS. The determination is based on a field in a TDRA list. The wireless device is further configured to transmit the uplink transmission in accordance with the determination.

According to another aspect, a method implemented by a network node is provided. The method includes indicating, to a wireless device, whether an uplink transmission is for PUSCH repetition or TBoMS. The indication is based on a field in a TDRA list. The method further includes receiving the uplink transmission from the wireless device in accordance with the indication.

According to another aspect, a network node is provided. The network node may include processing circuitry and memory circuitry, the memory circuitry containing instructions executable by the processing circuitry. The network node is configured to indicate, to a wireless device, whether an uplink transmission is for PUSCH repetition or TBoMS. The indication is based on a field in a TDRA list. The network node is further configured to receive the uplink transmission in accordance with the indication.

According to other aspects, computer programs are provided. The computer programs comprise instructions which, when executed on processing circuitry of a wireless device or a network node, cause the processing circuitry to carry out any of the methods provided above. According to other aspects, carriers are provided which contain the computer programs provided above.

BRIEF DESCRIPTION OF THE DRAWINGS

Aspects of the present disclosure are illustrated by way of example and are not limited by the accompanying figures with like references indicating like elements.

FIGS. 6-11 are Abstract Syntax Notation One (ASN.1) snippets illustrating example definitions of fields used for configuring an uplink, according to one or more embodiments of the present disclosure.

FIGS. 12-15 are tables useful for determining a PUSCH time domain resource allocation to apply, according to one or more embodiments of the present disclosure.

DETAILED DESCRIPTION

Figure 1:
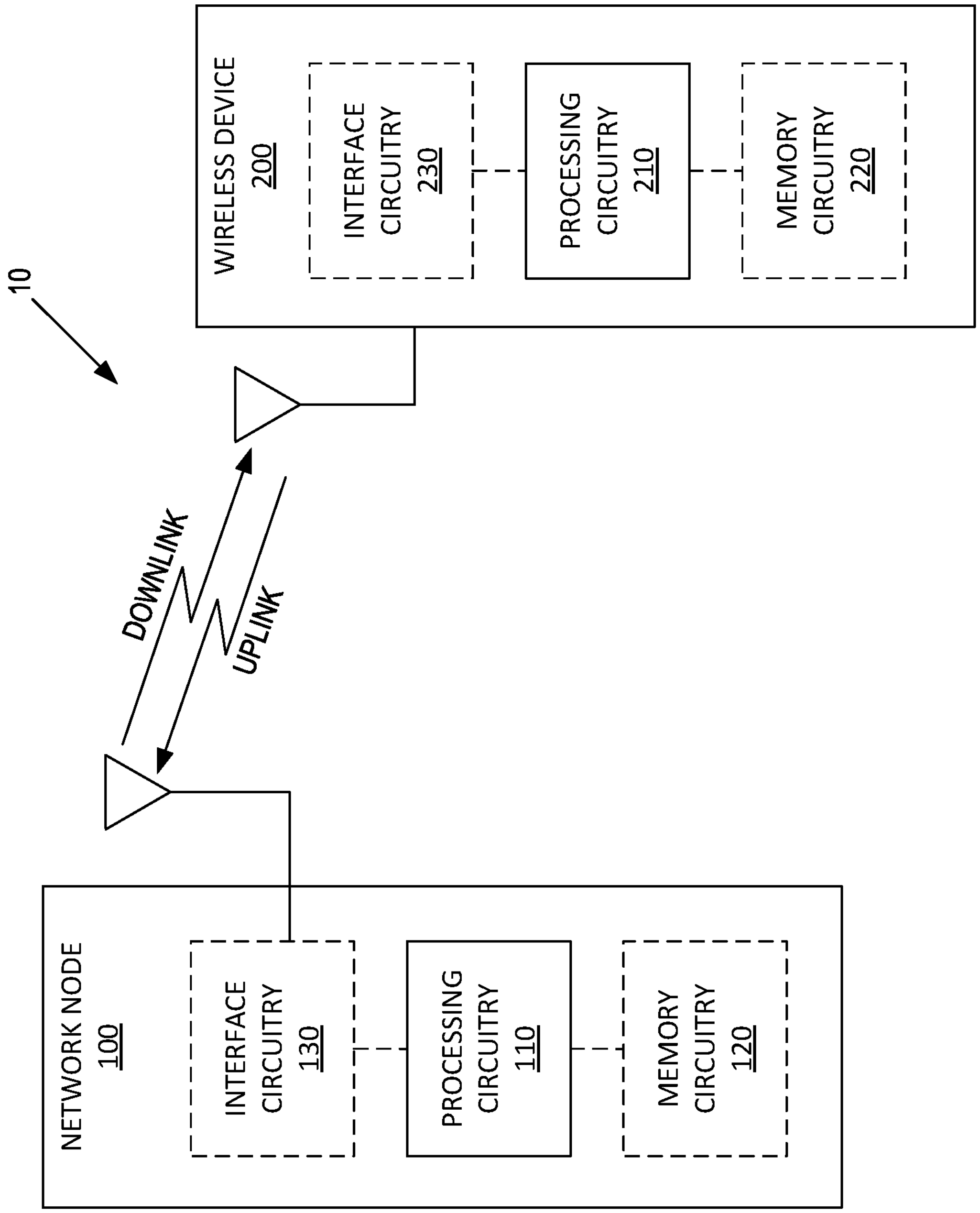
FIG. 1 is a schematic block diagram illustrating an example wireless communication network including a wireless device and a network node, according to one or more embodiments of the present disclosure.

Embodiments of the present disclosure relate to particular techniques in support of transmission repetition in a wireless communication network (e.g., using PUSCH repetition and/or TBoMS). FIG. 1 is a block diagram schematically illustrating an example wireless network 10 comprising a network node 100 and a wireless device 200. The network node 100 and the wireless device 200 each comprise processing circuitry 110, 210. In some embodiments, the network node 100 and/or the wireless device 200 further comprise interface circuitry 130, 230 and/or memory circuitry 120, 220.

For each of the devices 100, 200, the processing circuitry 110, 210 is communicatively coupled to the respective memory circuitry 120, 220 and the interface circuitry 130, 230 (as may be present), e.g., via one or more buses. The processing circuitry 110, 210 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 110, 210 may be programmable hardware capable of executing software instructions stored, e.g., as a machine-readable computer program in the memory circuitry 120, 220. The memory circuitry 120, 220 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 130, 230 of either or both devices 100, 200 may be a controller hub configured to control the input and output (I/O) data paths of the respective device 100, 200. Such I/O data paths may include data paths for exchanging signals over the network 10. For example, the interface circuitry 130, 230 may comprise a transceiver configured to send and receive radio signals. Either, both, or neither of the interface circuitry 130, 230 may be implemented as a unitary physical component of their respective devices 100, 200, or as a plurality of physical components (e.g., a transmitter, a receiver, etc.) that are contiguously or separately arranged, any of which may be communicatively coupled to any other, or may communicate with any other via processing circuitry 110, 210, respectively.

The network node 100 transmits signals to the wireless device 200 on a downlink supporting one or more downlink channels (e.g., a Physical Downlink Control Channel (PDCCH)). The wireless device 200 transmits signals to the network node 100 on an uplink supporting one or more uplink channels (e.g., a PUSCH). For example, the network node 100 may provide, to the wireless device 200, a serving cell and/or beam supporting the uplink and downlink between the network node 100 and wireless device 200. While the embodiments described herein will describe the wireless network 10 in the context of a 5G NR system, it will be appreciated that the solution presented herein may be applied to other RATs, e.g., a 6G RAT or multi-RAT systems.

The network node 100 may be any type of Radio Access Network (RAN) node, including (but are not limited to) a gNode B (gNB), a Base Station (BS), a Multi-Standard Radio (MSR) node, e.g., MSR BS, an eNode B (eNB), a network controller, a Radio Network Controller (RNC), a Base Station Controller (BSC), a relay, a donor node controlling relay, a Base Transceiver Station (BTS), an Access Point (AP), a transmission point, a transmission node, a Remote Radio Unit (RRU), a Remote Radio Head (RRH), a node in a Distributed Antenna System (DAS), and/or the like.

The wireless device 200 may be any type of device that wirelessly communicates with a network node 100. Examples of a wireless device 200 include (but are not limited to) a Device-to-Device (D2D) UE, a machine-type UE or UE capable of Machine-to-Machine (M2M) communication, a Personal Digital Assistant (PDA), a tablet or other mobile computer such as a laptop, a mobile terminal, a smart phone, a Laptop Embedded Equipment (LEE), a Laptop Mounted Equipment (LME), and the like.

As briefly discussed above, PUSCH repetition already has established techniques implemented in various 3GPP releases. Moreover, several features regarding how single TBoMS will be implemented have already been agreed upon for standardization. However, numerous aspects regarding how single TBoMS will be implemented still remain unknown. Among other things, it is presently unclear how support for TBoMS will be implemented in manner that can coexist with PUSCH repetition, how UEs will be configured for TBoMS, how UEs will distinguish a TBoMS configuration from a PUSCH repetition configuration, what TBoMS-specific signaling (if any) will be necessary.

For example, repetitions of a single TBoMS should be supported, where the number of configured repetitions is denoted by the value M. Correspondingly, the total number of allocated slots for TBoMS repetition may be determined by M*N, where N>1 and N is defined as the number of slots per repetition (after available slot determination for a single TBoMS transmission and before dropping rules are applied). That said, M*N may not be permitted to be larger than the maximum number of repetitions for performing the enhanced PUSCH repetition Type A that has been adopted. Further, the number of actually transmitted slots for the single TBoMS may be lower than N, depending on dropping rules for TBoMS transmission.

The existing constraints and commitments regarding uplink scheduling are myriad. For example, in addition to the above, available slot determination may be performed in accordance with existing agreements. Further, the number and location of allocated symbols within an allocated slot for TBoMS transmission are the same among all repeated single TBoMS. It is also expected that there will be no additional dropping rule optimization that will be introduced other than dropping rules for single TBoMS transmission.

Further still, in TBoMS, a value known as $N_{info}$ is used to calculate Transport Block Size (TBS). $N_{info}$ for TBoMS is calculated based on the number of Resource Elements (REs) determined in the first L symbols over which the TBoMS transmission is allocated, as scaled by a factor of K. The value of L is defined as the number of symbols determined using the Start and Length Indicator Value (SLIV) of the PUSCH indicated via the TDRA.

To calculate $N_{info}$ for TBS determination, the scaling factor of K=N is supported. It is unclear whether other scaling factors will be supported. That said, there is no support for K=1 for a single TBoMS. Further, the number of transmitted slots for the single TBoMS may be fewer than N, depending on the dropping rules for TBoMS transmission.

Traditionally, the scheduling of the PUSCH may be performed using a configured grant. A configured grant is a mechanism for allocating uplink transmission resources to a wireless device 200 in advance so that the wireless device 200 can transmit without having to first transmit a scheduling request to the network node 100 and await a response. In contrast, a dynamic grant is a mechanism in which uplink transmission resources are allocated to a wireless device 200 in response to a request from the wireless device 200. PUSCH scheduling using TBoMS may similarly support the use of configured grants.

Correspondingly, the wireless device 200 may respond to configured grants with feedback using a Hybrid Automatic Repeat Request (HARQ) process. If the wireless device 200 (or Medium Access Control (MAC) entity thereof) has a Cell Radio Network Temporary Identifier (C-RNTI), a Temporary C-RNTI, or a Configured Scheduling RNTI (CS-RNTI), then in order to support a PUSCH with configured grants, the wireless device 200 may be expected to behave in a predictable manner for each PDCCH occasion and for each serving cell belonging to a Timing Advance Group (TAG) that has a running timeAlignmentTimer and for each grant received for this PDCCH occasion, e.g., as follows:

Step 1: If an uplink grant for this Serving Cell has been received on the PDCCH for the MAC entity's C-RNTI or Temporary C-RNTI; or if an uplink grant has been received in a Random Access Response, go to step 2. Otherwise, go to step 5.

Step 2: If the uplink grant is for the MAC entity's C-RNTI and if the previous uplink grant delivered to the Hybrid Automatic Repeat Request (HARQ) entity for the same HARQ process was either an uplink grant received for the MAC entity's CS-RNTI or a configured uplink grant, then consider the New Data Indicator (NDI) to have been toggled for the corresponding HARQ process regardless of the value of the NDI.

Step 3: If the uplink grant is for the MAC entity's C-RNTI, and the identified HARQ process is configured for a configured uplink grant, then start or restart the configuredGrantTimer for the corresponding HARQ process (if configured), and stop the cg-RetransmissionTimer for the corresponding HARQ process (if running).

Step 4: Deliver the uplink grant and the associated HARQ information to the HARQ entity and end this procedure.

Step 5: If an uplink grant for this PDCCH occasion has been received for this Serving Cell on the PDCCH for the MAC entity's CS-RNTI, go to step 6. Otherwise, go to step 7.

Step 6: If the NDI in the received HARQ information is 1, then consider the NDI for the corresponding HARQ process not to have been toggled, start or restart the configuredGrantTimer for the corresponding HARQ process (if configured), stop the cg-RetransmissionTimer for the corresponding HARQ process (if running), deliver the uplink grant and the associated HARQ information to the HARQ entity, and end this procedure.

Step 7: If the NDI in the received HARQ information is 0 and the PDCCH contents indicate configured grant Type 2 deactivation, trigger configured uplink grant confirmation and end this procedure. Otherwise, the procedure continues.

Step 8: If the PDCCH contents indicate configured grant Type 2 activation, trigger configured uplink grant confirmation, store the uplink grant for this Serving Cell and the associated HARQ information as configured uplink grant, initialize or re-initialize the configured uplink grant for this Serving Cell to start in the associated PUSCH duration and to recur (according to certain standard rules), stop the configuredGrantTimer for the corresponding HARQ process (if running), stop the cg-RetransmissionTimer for the corresponding HARQ process (if running), and end this procedure.

Given all of the above, implementing TBoMS given many of the existing procedures and constraints surrounding previous scheduling techniques may be quite challenging. As mentioned above, in NR Rel-15/16, uplink transmission of a transport block is limited to a single-slot. Accordingly, many of the signaling and/or configuration techniques that would be required to effectively support the multi-slot transport blocks of TBoMS presently do not exist. Further, in Rel-16 UE determines the UL transmission is with or without repetition by numberOfRepetitions in TDRA table, where the value n1 indicates a PUSCH repetition configuration in which transport blocks are sent without repetition. Rel-17, in addition to support for PUSCH repetition techniques, are expected to accommodate at least a single TBoMS as well as a repetition of a single TBoMS (though it should be noted that additional TBoMS transmissions and/or additional repetitions may also be supported).

Given that values of N=1 are not supported for a single TBoMS, then N for TBoMS would need to be at least 2 in the TDRA table for TBoMS. However, if the network node 100 and/or wireless device 200 do not support or configure PUSCH repetition, a TDRA table that indicates N>=2 for TBoMS would not allow for dynamic scheduling between a single-slot TB and TBoMS for Dynamic Grant PUSCH (DG-PUSCH) or for Type 2 configured grants.

Figure 2:
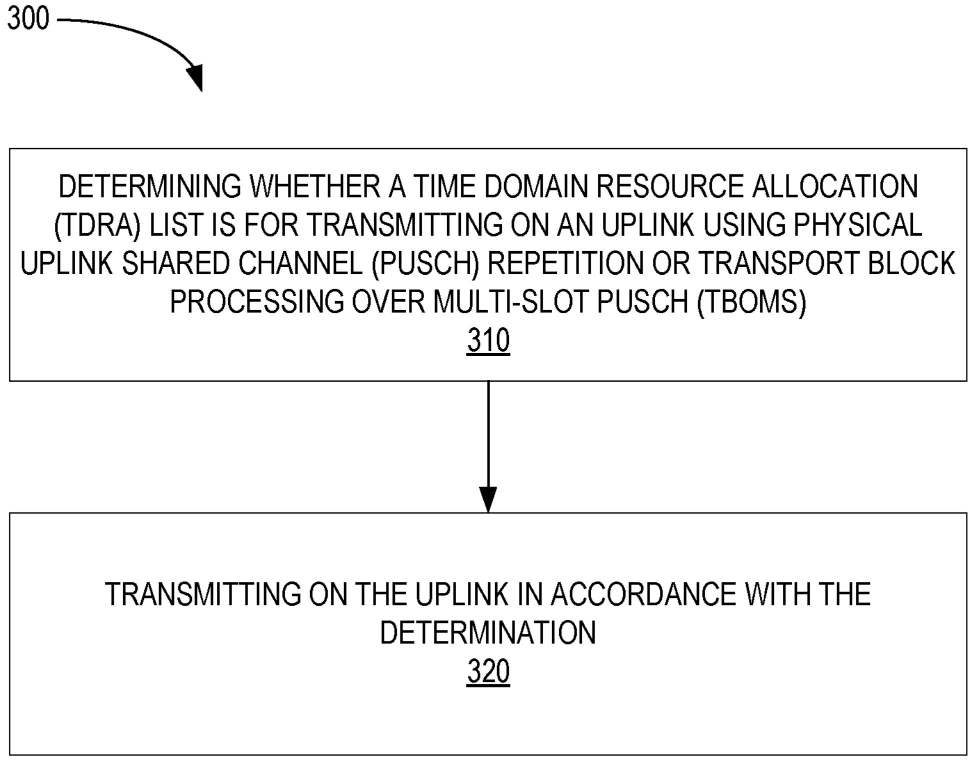
FIG. 2 is a flow diagram illustrating an example method implemented by a wireless device, according to one or more embodiments of the present disclosure.

From the above, it is a significant challenge to implement TBoMS in a manner that fits in well with existing PUSCH repetition techniques, e.g., without having to reinvent PUSCH scheduling entirely. In view of the above, FIG. 2 is a flow diagram illustrating an example method 300 implemented by a wireless device 200. The method 300 comprises determining whether a TDRA list is for transmitting on an uplink using PUSCH repetition or TBoMS (block 310), and transmitting on the uplink in accordance with the determination (block 320).

Embodiments of the present disclosure include a wireless device 200 configured to perform the method 300 of FIG. 2. In some particular examples, the processing circuitry 210 is configured to determine whether a TDRA list is for transmitting on an uplink using PUSCH repetition or TBoMS and transmit on the uplink in accordance with the determination (e.g., via the interface circuitry 230).

Figure 3:
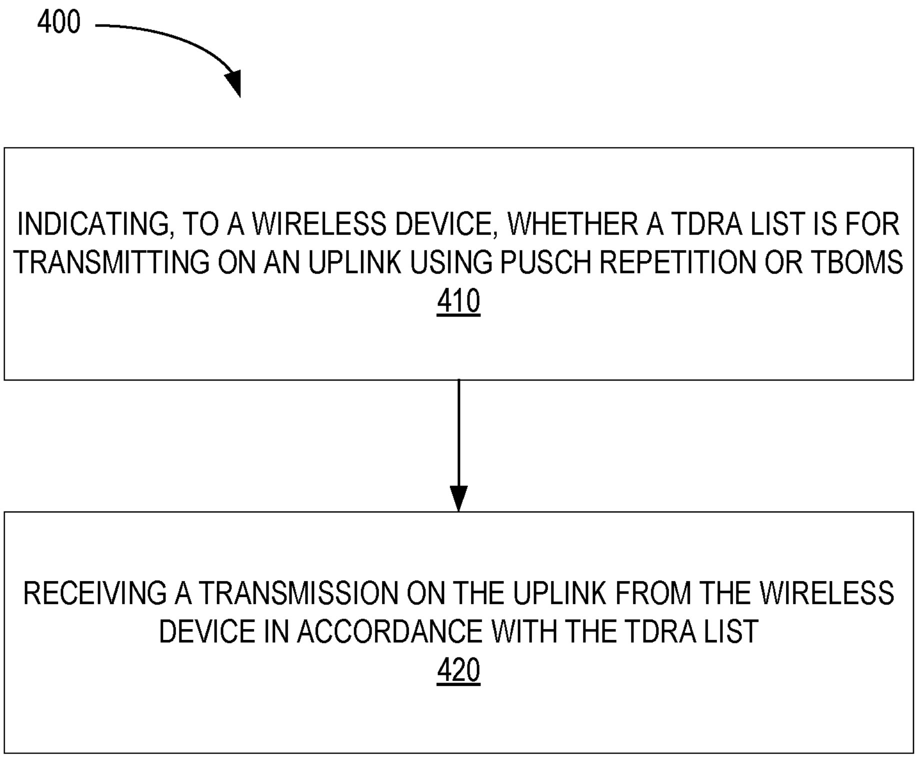
FIG. 3 is a flow diagram illustrating an example method implemented by a network node, according to one or more embodiments of the present disclosure.

FIG. 3 is a flow diagram illustrating an example method 400 implemented by a network node 100. The method 400 comprises indicating, to a wireless device 200, whether a TDRA list is for transmitting on an uplink using PUSCH repetition or TBoMS (block 410), and receiving a transmission on the uplink from the wireless device 200 in accordance with the TDRA list (block 420).

Embodiments of the present disclosure include a network node 100 configured to perform the method 400 of FIG. 3. In some particular examples, the processing circuitry 110 is configured to indicate, to a wireless device 200, whether a TDRA list is for transmitting on an uplink using PUSCH repetition or TBoMS and receive a transmission on the uplink from the wireless device 200 in accordance with the TDRA list (e.g., via the interface circuitry 130).

As will be discussed in further detail below, one or more embodiments of the present disclosure additionally or alternative include one or more ways to indicate the number of slots for a single TBoMS. Further still, particular embodiments include having a new TDRA list for TBoMS, whereas other embodiments include a TDRA list that is shared between TBoMS and PUSCH repetition. To configure or signal repetitions of TBoMS, some embodiments include using a new TDRA list with separate columns or sets of predefined values for indicating the respective values of M and N. In general, for embodiments in which TBoMS and PUSCH repetition are configured using different TDRA tables (e.g., by a higher layer), the wireless device 200 will determine which TDRA table to use. More specifically, in some embodiments, the wireless device 200 determines transmission type first and then uses the corresponding TDRA table. In other embodiments, the wireless device 200 determines which TDRA table to use and uses the corresponding transmission type.

Further, given that TBoMS may only be supported based on available slots, one or more embodiments of the present disclosure include a TDRA for TBoMS that is based on the TDRA list for PUSCH repetition counted based on available slot (including the case without any repetition, i.e., when the repetition factor is 1).

Although embodiments of the present disclosure will discuss a “TDRA list for TBoMS,” a “TBoMS TDRA list,” or similar phrasing, these phrases should not be interpreted to necessarily mean a TDRA list that is exclusively used for TBoMS, as the TDRA list may (in at least some embodiments) also be used for PUSCH repetition and the wireless device 200 will determine which transmission type to use based on one or more criteria, as discussed in further detail below. That said, other embodiments include a TDRA list for TBoMS that is separate from a TDRA list for PUSCH repetition. In such embodiments, fields that are relevant only to TBoMS may be absent from the TDRA list for PUSCH repetition, and vice versa.

In some embodiments, the wireless device 200 does not support and/or the network node 100 does not use PUSCH repetition. Accordingly, the network node 100 may, in such embodiments, grant uplink resources for either a single-slot transport block or TBoMS, the latter of which is transmitted over two or more slots. Allowing an entry of single-slot transport block with the number of slots as 1 in the TBoMS TDRA list can allow for dynamic and efficient scheduling of a single transport block without repetition or of a TBoMS with DCI command. Otherwise, for example, with TBoMS using a Type 2 configured grant, if the network node 100 wants to change the type of uplink transmission to a single-slot TB without repetition, additional RRC configuration of a TDRA list for PUSCH repetition is needed.

In some embodiments, the TDRA list for TBoMS includes a field that indicates the number of allocated slots for TBoMS. In some such embodiments, this field is permitted to have a value of 1 (or its equivalent), which indicates that the configuration is for single-slot transport block transmission. FIG. 6 is an example Abstract Syntax Notation One (ASN.1) snippet consistent with such an embodiment. In the example of FIG. 6, the value of n1 in field numberOfSlotsTBoMS-r17 is used to indicate transmission of a single-slot transport block. In some embodiments, when the number of slots is configured as 1 in an entry of the TDRA table, the number of repetitions may be restrained to 1. Additionally or alternatively, resource allocation of a single-slot transport block without repetition can be configured in the TDRA list for TBOMS.

According to other embodiments, only one TDRA list is defined for PUSCH repetition and TBoMS in a given 3GPP release, and the wireless device 200 determines whether the scheduled uplink transmission is for PUSCH repetition or TBoMS.

In some such embodiments, the wireless device 200 receives an explicit indication of whether an uplink grant is for PUSCH repetition or TBoMS, e.g., via Radio Resource Control (RRC) or DCI signaling. That is, the wireless device 200 may receive an RRC parameter or a DCI field that includes an explicit indication of whether the uplink grant is for PUSCH repetition or TBoMS scheduling.

Additionally or alternatively, the wireless device 200 may interpret a field in the TDRA list as either indicating a number of repetitions or a number of allocated slots depending respectively on whether the TDRA list is determined to be for PUSCH repetition or for TBoMS. For example, the TDRA list may reuse the Rel-16 PUSCH repetition format (e.g., without new fields explicitly for supporting TBoMS) and the value of the the number of repetitions field in the TDRA list can be repurposed as a number of allocated slots field when the TDRA list is determined to be for TBOMS. Such an embodiment may be appropriate, e.g., when the wireless device 200 supports TBoMS but does not support repetition of TBoMS.

Alternatively, the TDRA list may comprise separate fields for the number of slots and the number of repetitions, and it may be that they both are present in the TDRA list regardless of whether the uplink transmission type is PUSCH repetition or TBoMS. In such an embodiment, a value of 1 for number of slots indicates PUSCH repetition whereas a value larger than 1 for number of slots indicates the number of allocated slots for a TBoMS. FIG. 7 is an example ASN.1 snippet consistent with such an embodiment.

Although the wireless device 200 may receive an explicit indication of uplink transmission type in some such embodiments, other embodiments lack such an explicit indication and the UE determines that the TDRA list is for PUSCH repetition or TBoMS based, e.g., on the value of numberOfSlotsTBoMSnumber of slots. Accordingly, a pusch-TimeDomainAllocationList definition for a single DCI format may suffice. FIG. 8 is an example ASN.1 snippet in which one Rel-17 pusch-TimeDomainAllocationList for one DCI format is defined. It should be noted that the total number of slots for TBoMS transmission including repetitions should be no larger than a given maximum (e.g., 32). That is, the number of repetitions indicated by the numberOfRepetitions-r17 field times the number of slots indicated by the numberOfSlotsForTBoMS-r17 field should be no larger than 32.

Other embodiments include a TDRA list that supports separate fields for number of slots and for number of repetitions, and the number of slots field is only present when the uplink transmission type is TBoMS. Correspondingly, the absence of the number of slots field indicates that the uplink transmission type is PUSCH repetition. FIG. 9 is an example ASN.1 snippet consistent with such an embodiment.

In such embodiments, in the definition of pusch-TimeDomainAllocationListForTBoMS-r17, the numberOfSlotsForTBoMS-r17 should be present. In the definition of pusch-TimeDomainAllocationListDCI-0-2-r17, the numberOfSlotsForTBoMS-r17 field may be optionally absent. Further, in the pusch-TimeDomainAllocationListDCI-0-1-r17, the numberOfSlotsForTBoMS-r17 field may be optionally absent.

Although the wireless device 200 may receive an explicit indication of uplink transmission type in some such embodiments, other embodiments lack such an explicit indication and the UE determines that the TDRA list is for PUSCH repetition or TBoMS based, e.g., on the presence or absence of the number of slots field. Thus, PUSCH repetition and TBoMS may have separate time domain allocation lists, as shown in the example ASN.1 snippet of FIG. 10.

In other embodiments, TBoMS is supported when the PUSCH is scheduled by a specific TDRA list (e.g., a new TDRA list to be introduced in NR Rel-17) and when counting the repetition factor based on available slot is enabled for PUSCH transmission/repetition. As an example, one or multiple new TDRA lists in NR Rel-17 can be introduced to support TBoMS.

In yet other embodiments, TBoMS is supported when the PUSCH is scheduled by a TDRA list introduced in NR Rel-15 or Rel-16, and when counting the repetition factor based on available slot is enabled for PUSCH transmission/repetition and when TBoMS is enabled independently from the TDRA list.

As an example, an RRC parameter or L1 parameter can be configured to indicate whether TBoMS is enabled and how many slots are configured per TBoMS, and legacy TDRA list can be used to determine the symbol allocation within one slot for the transmission of TBoMS.

In yet other embodiments, TBoMS is only supported for Type A PUSCH repetition where the repetition factor can be either 1 or more than one, where the Type A PUSCH repetition means either legacy TDRA in NR Rel-15, or TDRA of Type A PUSCH repetition in NR Rel-16.

Yet other embodiments make use of a relationship between a Time Domain Allocation (TDA) list and the TDRA list. NR Rel-15, for example, supports one pusch-TimeDomainAllocationList in pusch-Config, whereas Rel-16 supports three TDA lists. The Rel-15 TDA list uses a Rel-15 TDRA list, whereas only one Rel-16 TDRA list is defined for all three Rel-16 TDA lists. Only one Rel-16 TDRA list can support PUSCH repetition Type A, PUSCH repetition Type B, and multiple PUSCH with some fields present or absent in different TDA list.

According to some of the embodiments described herein, one Rel-17 TDRA list may be defined for NR Rel-17, and either one TDA list or separate TDA lists for PUSCH repetition and TBoMS may be defined. For example, a TDA list may be defined for PUSCH repetition and a DCI format for TBoMS may be used. Other embodiments require separate TDA lists for PUSCH repetition and TBoMS. That said, TBoMS transmission may not be scheduled by DCI format 0_0. FIG. 11 is an ASN.1 snippet that includes example TDMA list and TDA list definitions consistent with at least some such embodiments.

In yet other embodiments, when DCI Format 0_1 is supported to schedule TBoMS and/or enhanced Type A PUSCH repetition (e.g., in NR Rel-17), a table may be used to determine which of a plurality of TDA lists to use (if any) for PUSCH scheduling. FIG. 12 is an example table that includes a TDA list that supports TBoMS scheduling (i.e., pusch-TimeDomainAllocationListDCI-0-1-r17). FIG. 13 is an example table that includes a TDA list that supports Rel-17 PUSCH repetition and a TDA list that supports TBoMS.

FIGS. 12 and 13 provide examples in which several criteria may be used to determine an applicable TDA list to apply when DCI Format 0_1 is used to schedule the PUSCH. FIGS. 14 and 15 provide examples in which several criteria may be used to determine an applicable TDA list to apply when DCI Format 0_2 is used to schedule the PUSCH (e.g., in Rel-17).

That is, when DCI Format 0_2 is supported to schedule TBoMS and/or enhanced Type A PUSCH repetition in NR Rel-17, one or more TDA lists for scheduling PUSCH can be included in a table used for determining which uplink transmission type to use. An example of such a table is provided in FIG. 14. In the example of FIG. 14, one TDA list pusch-TimeDomainAllocationListDCI-0-2-r17 supporting TBoMS scheduling is included in the table, and the wireless device 200 may use the table to determine whether or not to use TBoMS based on the table. As another example, FIG. 15 is a table that includes separate TDA lists for Rel-17 PUSCH repetition and TBoMS that are usable by the wireless device 200.

It should be noted that support for TBoMS may be limited in one or more ways, depending on the embodiment. For example, in some embodiments wireless device support for enhanced Type A PUSCH repetition (with up to more than 16 repetitions and/or repeated based on available slot) and TBoMS are associated with each other. In one such example, TBoMS is only supported for wireless devices 200 that also support enhanced Type A PUSCH repetitions (e.g., in NR Rel-17). That said, in other embodiments, wireless device support for enhanced Type A PUSCH repetition (with up to more than 16 repetitions and/or repeated based on available slot) and TBoMS are independent from each other.

According to yet other embodiments, multiple PUSCH is not be supported for TBoMS transmissions. Further, in some embodiments, TBoMS transmissions are not supported in unlicensed spectrum (or for operation in another environment with shared spectrum channel access). Such limitations may be particular to a given NR release (e.g., NR Rel-17) or may pertain to a plurality of releases.

Figure 4:
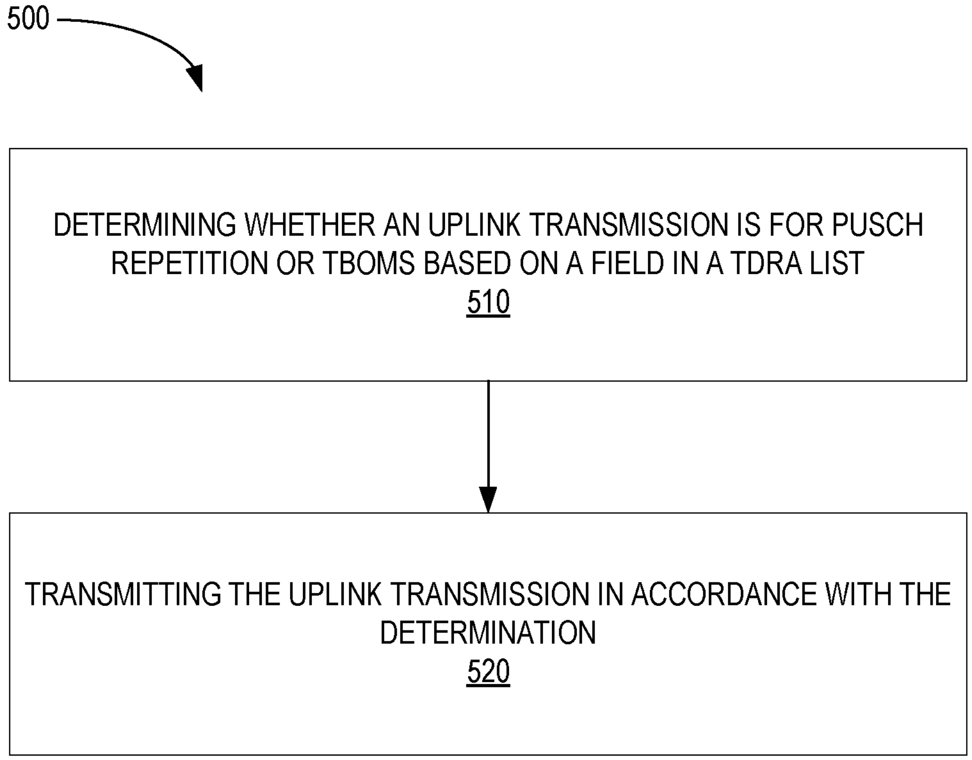
FIG. 4 is a flow diagram illustrating an example method implemented by a wireless device, according to one or more embodiments of the present disclosure.

FIG. 4 is a flow diagram illustrating an example method 500 implemented by a wireless device 200. The method 500 comprises determining 510 whether an uplink transmission is for PUSCH repetition or TBoMS based on a field in a TDRA list. The method 500 further comprises transmitting 520 the uplink transmission in accordance with the determination.

In some embodiments, the TDRA list is defined for PUSCH repetition and TBoMS. In some embodiments, the TDRA list may comprise separate fields for the number of slots and the number of repetitions, regardless of whether the uplink transmission is for PUSCH repetition or TBoMS. In some embodiments, the value of the field for the number of slots may indicate one of 1, 2, 4, or 8 slots.

In some embodiments, determining 510 whether the uplink transmission is for PUSCH repetition or TBoMS may comprise determining that the uplink transmission is for PUSCH repetition responsive to the field for the number of slots in the TDRA list having a value that indicates one slot.

In some embodiments, when it is determined 510 that the uplink transmission is for PUSCH repetition, a number of repetitions to be used for the PUSCH repetition may be determined according to the value of the field for the number of repetitions.

In some embodiments, determining 510 whether the uplink transmission is for PUSCH repetition or TBoMS may comprise determining that the uplink transmission is for TBoMS responsive to the field for the number of slots in the TDRA list having a value that indicates more than one slot.

In some embodiments, when it is determined 510 that the uplink transmission is for TBoMS, the number of repetitions to be used for the TBoMS may be determined according to the value of the field for the number of repetitions.

In some embodiments, the total number of allocated slots for TBoMS repetition may be less than or equal to the maximum number of repetitions for performing an enhanced PUSCH repetition Type A. In some examples, the maximum number of repetitions for performing the enhanced PUSCH repetition Type A is 32.

In some embodiments, the wireless device support for enhanced Type A PUSCH repetition and TBoMS may be independent from each other. In some embodiments, TBoMS transmissions are not supported in unlicensed spectrum.

In some embodiments, PUSCH repetition comprises one or more repetitions of a single-slot transport block. In some embodiments, TBoMS extends the time domain resource for the transmission of a transport block across a slot border.

Embodiments of the present disclosure include a wireless device 200 configured to perform the method 500 of FIG. 4. In some particular examples, the processing circuitry 210 is configured to determine whether an uplink transmission is for PUSCH repetition or TBoMS based on a field in a TDRA list and transmit the uplink transmission in accordance with the determination (e.g., via the interface circuitry 230).

Figure 5:
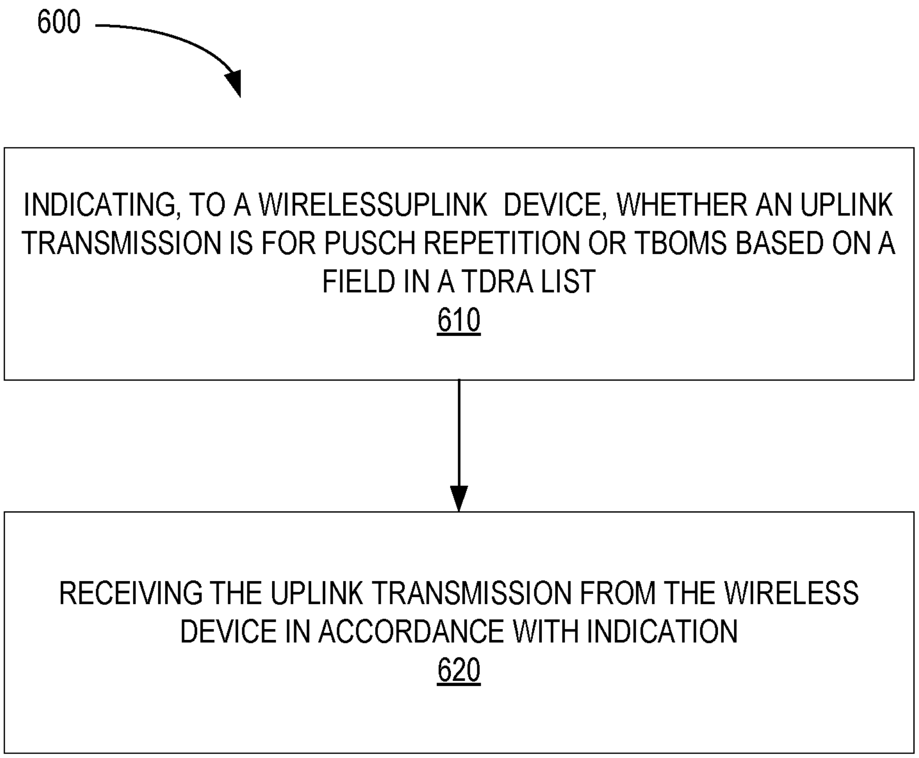
FIG. 5 is a flow diagram illustrating an example method implemented by a network node, according to one or more embodiments of the present disclosure.

FIG. 5 is a flow diagram illustrating an example method 600 implemented by a network node 100. The method 600 comprises indicating 610, to a wireless device, whether an uplink transmission is for PUSCH repetition or TBoMS based on a field in a TDRA list. The method 600 further comprises receiving 620 the uplink transmission from the wireless device in accordance with the indication.

In some embodiments, the indicating 610 may comprise including, in a number of slots field in the TDRA list, a value that indicates one slot or a value that indicates more than one slot, and transmitting the TDRA list to the wireless device. In some examples, a value that indicates one slot indicates that the uplink transmission is for PUSCH repetition and a value that indicates more than one slot indicates that the uplink transmission is for TBoMS.

In some embodiments, when it is indicated that the uplink transmission is for PUSCH repetition, the method 600 may further comprise indicating a number of repetitions to be used for the PUSCH repetition according to the value of the field for the number of repetitions.

In some embodiments, when it is indicated that the uplink transmission is for TBoMS, the method 600 may further comprise indicating a number of repetitions to be used for the TBoMS according to the value of the field for the number of repetitions.

Embodiments of the present disclosure include a network node 100 configured to perform the method 600 of FIG. 5. In some particular examples, the processing circuitry 110 is configured to indicate, to a wireless device, whether an uplink transmission is for PUSCH repetition or TBoMS based on a field in a TDRA list and receive the uplink transmission from the wireless device in accordance with the indication (e.g., via the interface circuitry 130).

Figure 16:
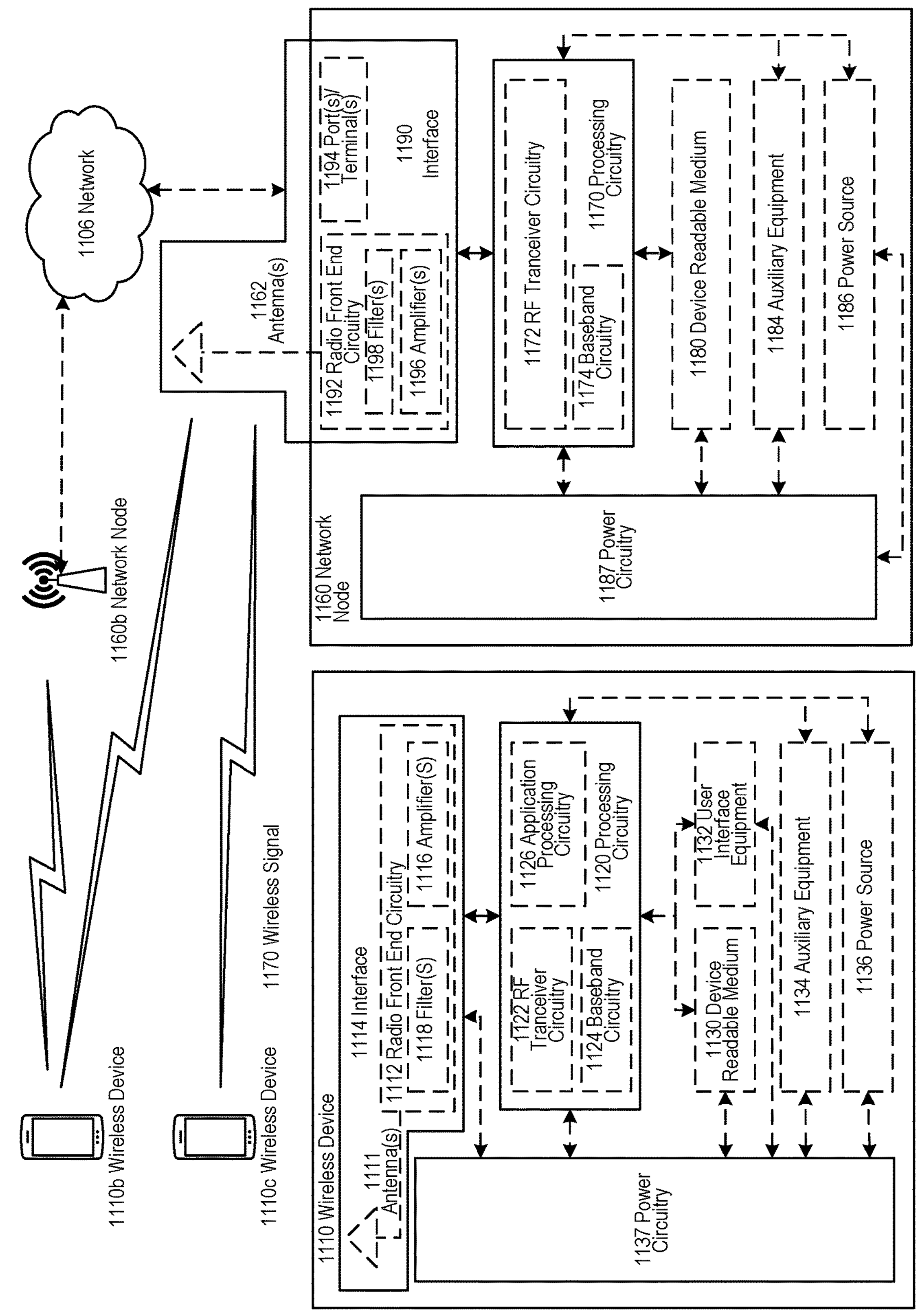
FIG. 16 is a schematic block diagram illustrating another example wireless communication network, according to one or more embodiments of the present disclosure.

Although the subject matter described herein may be implemented in any appropriate type of system using any suitable components, the embodiments disclosed herein are described in relation to a wireless network, such as the example wireless network illustrated in FIG. 16. For simplicity, the wireless network of FIG. 16 only depicts network 1106, network nodes 1160 and 1160*b*, and WDs 1110, 1110*b*, and 1110*c*. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 16, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 16 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 16 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc., A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 17:
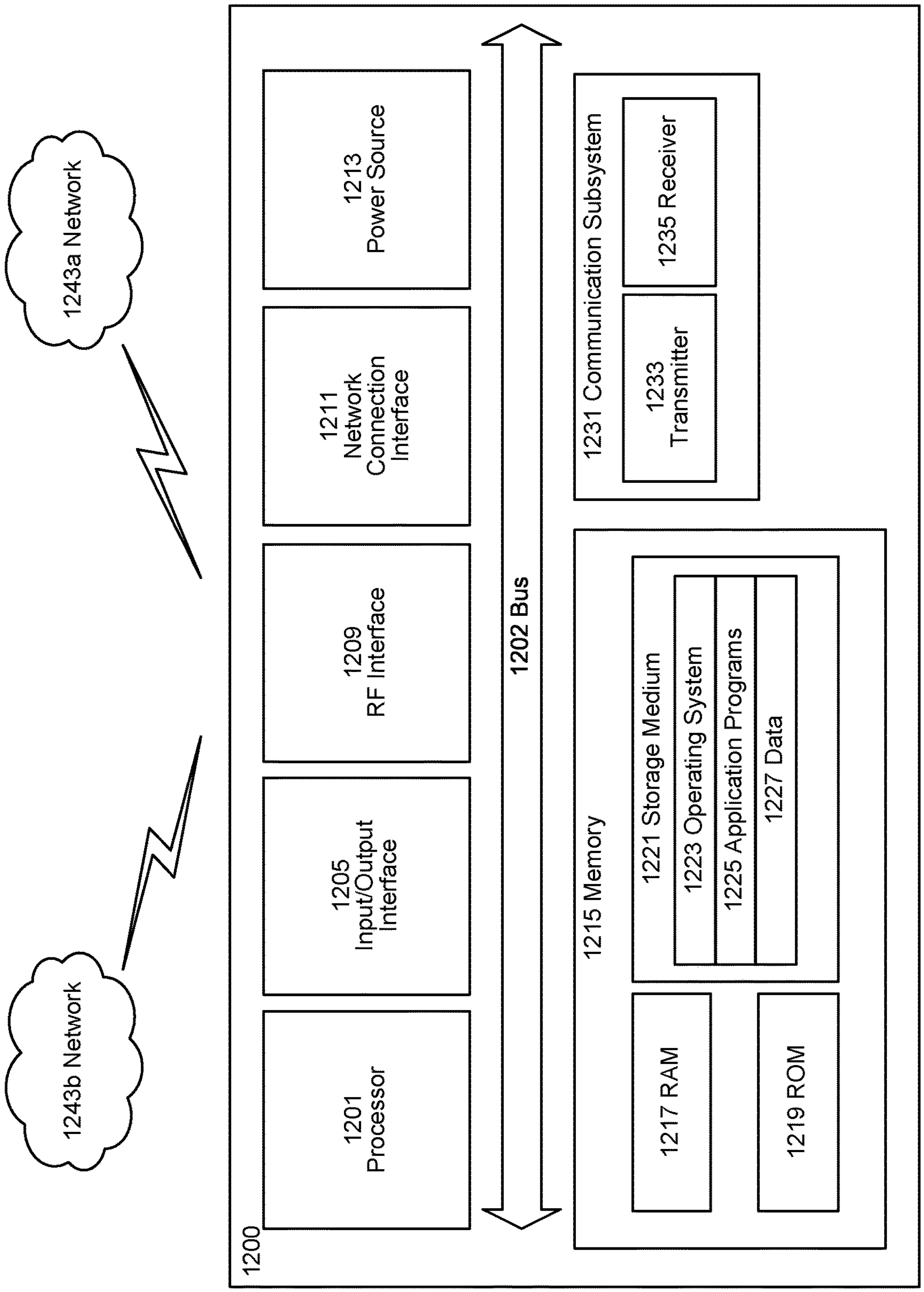
FIG. 17 is a schematic block diagram illustrating an example wireless device, according to one or more embodiments of the present disclosure.

FIG. 17 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 17, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 17 is a UE, the components discussed herein are equally applicable to a WD, and vice-versa.

In FIG. 17, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 17, or only a subset of the components. The level of integration between the components may vary from one UE to another UE. Further, certain UEs may contain multiple instances of a component, such as multiple processors, memories, transceivers, transmitters, receivers, etc.

In FIG. 17, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 17, RF interface 1209 may be configured to provide a communication interface to RF components such as a transmitter, a receiver, and an antenna. Network connection interface 1211 may be configured to provide a communication interface to network **1243*a*. Network 1243*a* may encompass wired and/or wireless networks such as a local-area network (LAN), a wide-area network (WAN), a computer network, a wireless network, a telecommunications network, another like network or any combination thereof. For example, network 1243*a* may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211** may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 17, processing circuitry 1201 may be configured to communicate with network **1243*b* using communication subsystem 1231. Network 1243*a* and network 1243*b* may be the same network or networks or different network or networks. Communication subsystem 1231 may be configured to include one or more transceivers used to communicate with network 1243*b*. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.16, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235** of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243*b* may encompass wired and/or wireless networks such as a local-area network (LAN), a wide-area network (WAN), a computer network, a wireless network, a telecommunications network, another like network or any combination thereof. For example, network 1243*b* may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 18:
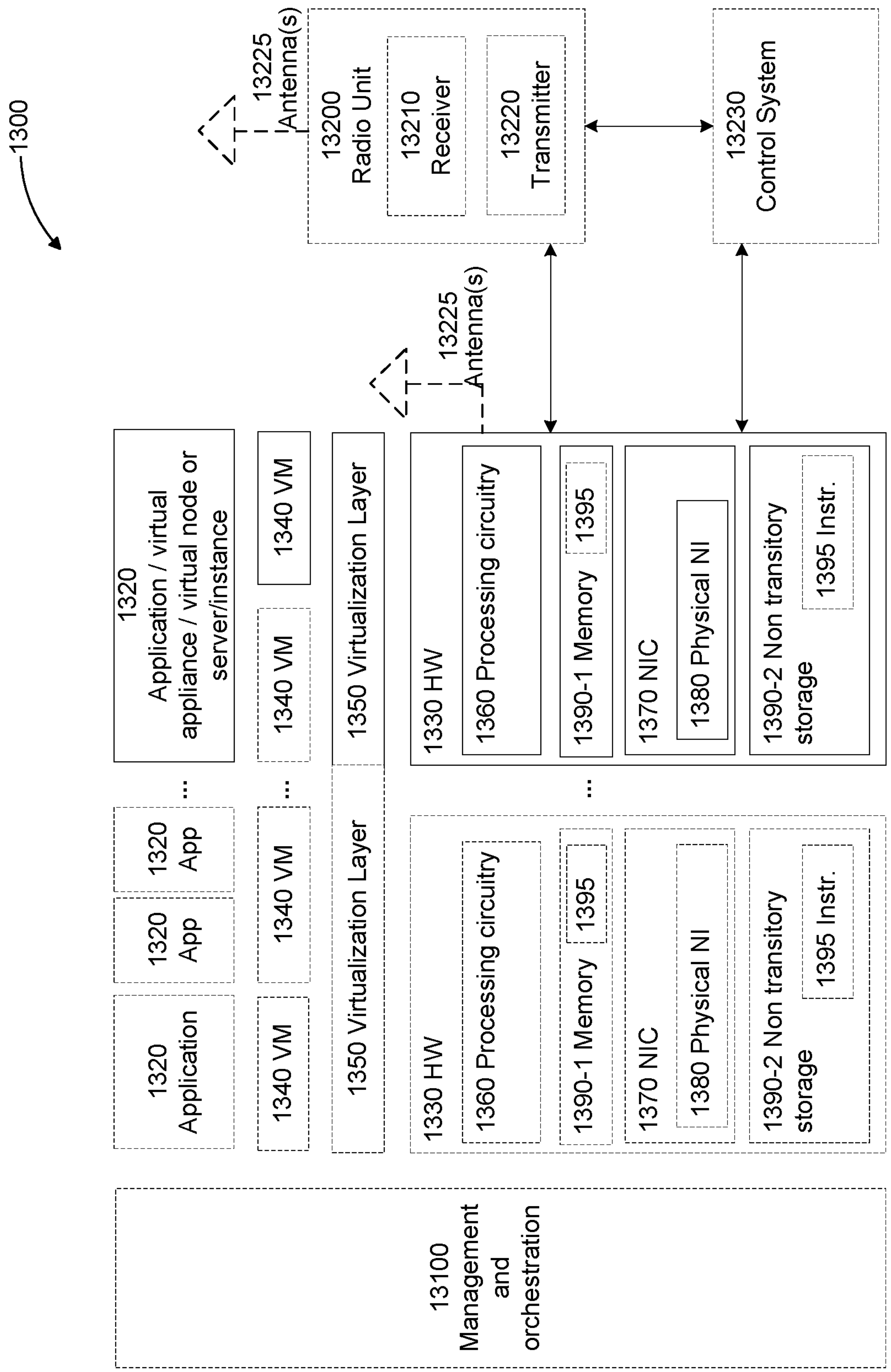
FIG. 18 is a schematic block diagram illustrating an example virtualization environment, according to one or more embodiments of the present disclosure.

FIG. 18 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 18, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 18.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be effected with the use of control system 13230 which may alternatively be used for communication between the hardware nodes 1330 and radio units 13200.

Figure 19:
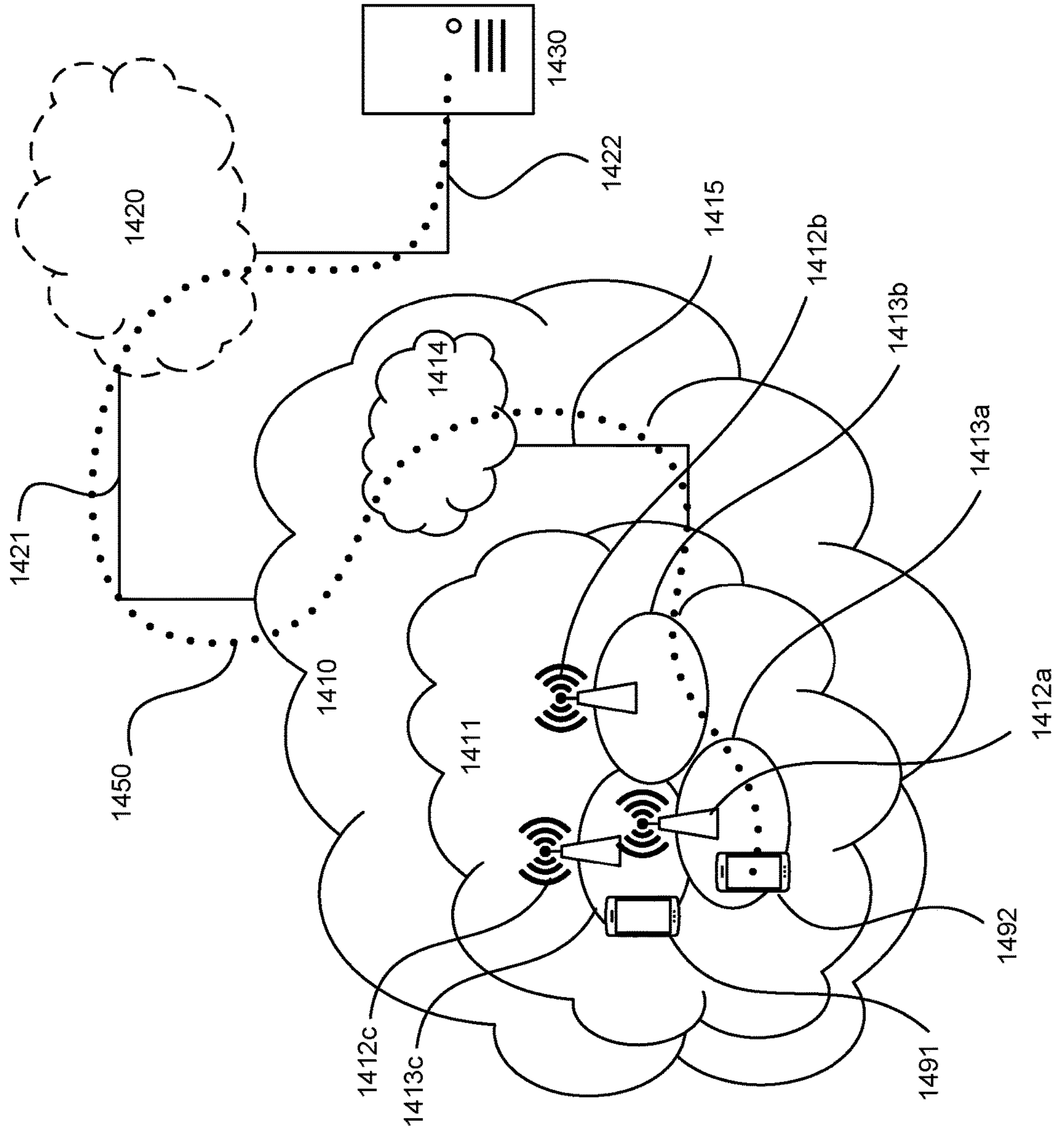
FIG. 19 is a schematic illustrating an example telecommunication network connected via an intermediate network to a host computer, according to one or more embodiments of the present disclosure.

FIG. 19 illustrates a telecommunication network connected via an intermediate network to a host computer in accordance with some embodiments. In particular, with reference to FIG. 19, in accordance with an embodiment, a communication system includes telecommunication network 1410, such as a 3GPP-type cellular network, which comprises access network 1411, such as a radio access network, and core network 1414. Access network 1411 comprises a plurality of base stations 1412*a*, 1412*b*, 1412*c*, such as NBs, eNBs, gNBs or other types of wireless access points, each defining a corresponding coverage area 1413*a*, 1413*b*, 1413*c*. Each base station 1412*a*, 1412*b*, 1412*c* is connectable to core network 1414 over a wired or wireless connection 1415. A first UE 1491 located in coverage area 1413*c* is configured to wirelessly connect to, or be paged by, the corresponding base station 1412*c*. A second UE 1492 in coverage area 1413*a* is wirelessly connectable to the corresponding base station 1412*a*. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 19 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 20:
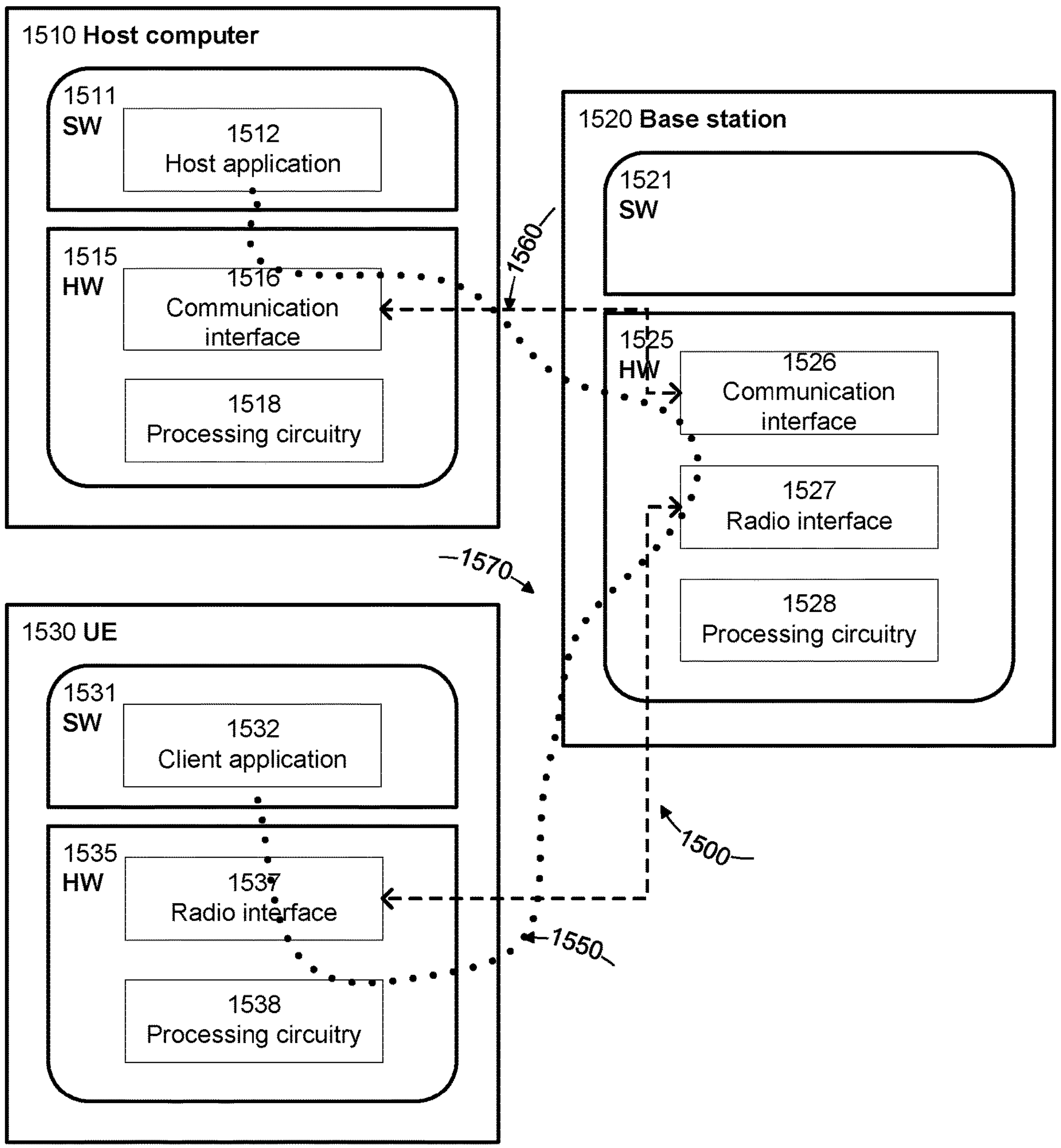
FIG. 20 is a schematic block diagram illustrating an example host computer communicating via a base station with a user equipment over a partially wireless connection, according to one or more embodiments of the present disclosure.

Example implementations, in accordance with an embodiment, of the UE, base station and host computer discussed in the preceding paragraphs will now be described with reference to FIG. 20. FIG. 20 illustrates host computer communicating via a base station with a user equipment over a partially wireless connection in accordance with some embodiments. In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 20) served by base station 1520. Communication interface 1526 may be configured to facilitate connection 1560 to host computer 1510. Connection 1560 may be direct or it may pass through a core network (not shown in FIG. 20) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 20 may be similar or identical to host computer 1430, one of base stations 1412*a*, 1412*b*, 1412*c* and one of UEs 1491, 1492 of FIG. 19, respectively. This is to say, the inner workings of these entities may be as shown in FIG. 20 and independently, the surrounding network topology may be that of FIG. 19.

In FIG. 20, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may expand the capabilities of uplink scheduling and thereby provide benefits such as more flexible transmission capabilities on the uplink.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 21:
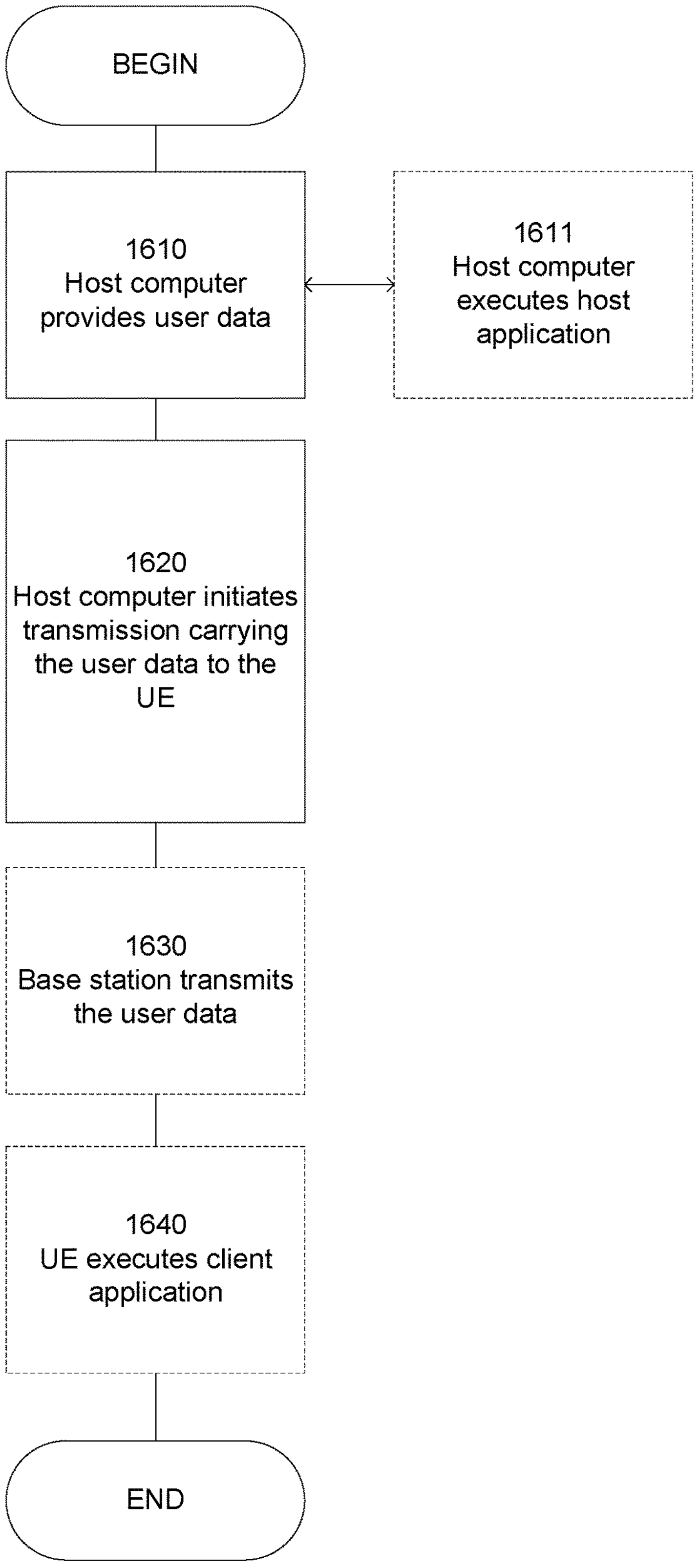
FIGS. 21-24 illustrate example methods implemented in a wireless communication system, according to one or more embodiments of the present disclosure.

FIG. 21 is a flowchart illustrating a method implemented in a communication system, in accordance with one embodiment. The communication system includes a host computer, a base station and a UE which may be those described with reference to FIG. 19 and FIG. 20. For simplicity of the present disclosure, only drawing references to FIG. 21 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 22:
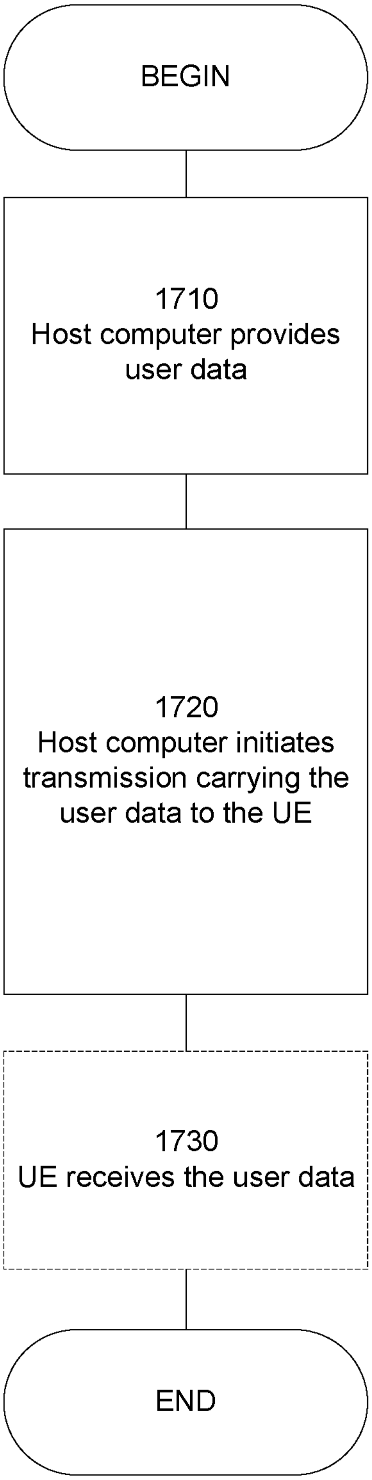

FIG. 22 is a flowchart illustrating a method implemented in a communication system, in accordance with one embodiment. The communication system includes a host computer, a base station and a UE which may be those described with reference to FIG. 19 and FIG. 20. For simplicity of the present disclosure, only drawing references to FIG. 22 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 23:
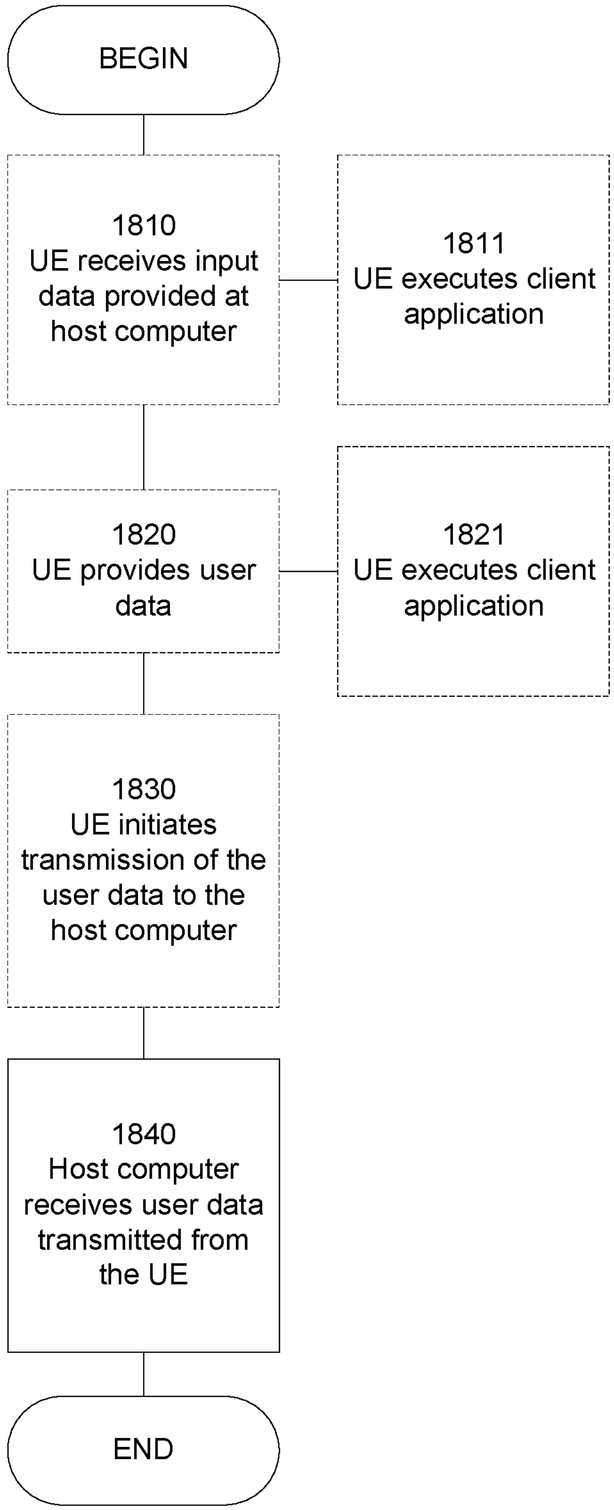

FIG. 23 is a flowchart illustrating a method implemented in a communication system, in accordance with one embodiment. The communication system includes a host computer, a base station and a UE which may be those described with reference to FIG. 19 and FIG. 20. For simplicity of the present disclosure, only drawing references to FIG. 23 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 24:
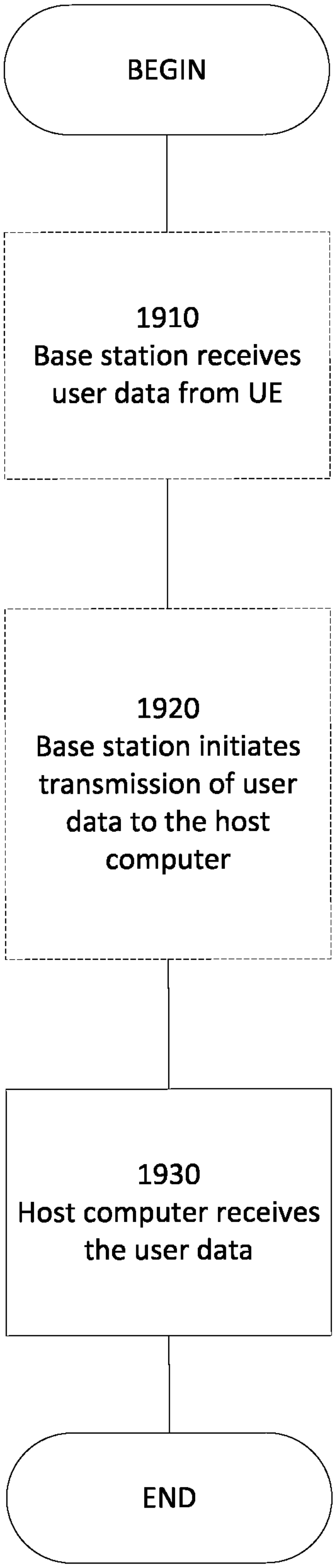

FIG. 24 is a flowchart illustrating a method implemented in a communication system, in accordance with one embodiment. The communication system includes a host computer, a base station and a UE which may be those described with reference to FIG. 19 and FIG. 20. For simplicity of the present disclosure, only drawing references to FIG. 24 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended embodiments are intended to be embraced therein.

EXAMPLE EMBODIMENTS

Embodiment 1. A method, implemented in a wireless device (200), the method comprising:

- determining whether a Time Domain Resource Allocation (TDRA) list is for transmitting on an uplink using Physical Uplink Shared Channel (PUSCH) repetition or Transport Block processing over Multi-Slot PUSCH (TBoMS); and
- transmitting on the uplink in accordance with the determination.

Embodiment 2. The method of embodiment 0, further comprising receiving an explicit indication of whether the TDRA list is for PUSCH repetition or TBoMS via Radio Resource Control (RRC) or Downlink Control Information (DCI) signaling.

Embodiment 3. The method of embodiment 0, wherein:

- the explicit indication indicates that TBoMS is enabled and how many slots are configured per TBoMS transmission; and
- the method further comprises determining a symbol allocation within a single slot.

Embodiment 4. The method of embodiment 0, further comprising interpreting a field in the TDRA list as either indicating a number of repetitions or a number of allocated slots depending respectively on whether the TDRA list is determined to be for PUSCH repetition or for TBoMS.

Embodiment 5. The method of embodiment 0, wherein determining whether the TDRA list is for transmitting on the uplink using PUSCH repetition or TBoMS comprises determining that the TDRA list is for PUSCH repetition responsive to a number of slots field in the TDRA list having a value that indicates one slot.

Embodiment 6. The method of embodiment 0, wherein determining whether the TDRA list is for transmitting on the uplink using PUSCH repetition or TBoMS comprises determining that the TDRA list is for TBoMS responsive to a number of slots field in the TDRA list having a value that indicates more than one slot.

Embodiment 7. The method of embodiment 0, wherein determining whether the TDRA list is for transmitting on the uplink using PUSCH repetition or TBoMS is based respectively on whether a number of slots field within the TDRA list is absent or present.

Embodiment 8. The method of embodiment 0, wherein:

- the TDRA list complies with one of a plurality of release-specific definitions; and determining whether the TDRA list is for transmitting on the uplink using PUSCH repetition or TBoMS is based on which of the release-specific definitions the TDRA list complies with.

Embodiment 9. The method of embodiment 0, wherein determining whether the TDRA list is for transmitting on the uplink using PUSCH repetition or TBoMS is responsive to counting of a repetition factor based on slot availability being enabled.

Embodiment 10. The method of embodiment 0, wherein determining whether the TDRA list is for transmitting on the uplink using PUSCH repetition or TBoMS comprises determining that the TDRA list is for transmitting on the uplink using TBoMS responsive to determining that the TDRA list indicates a Type A PUSCH repetition configuration having a repetition factor greater than or equal to one.

Embodiment 11. The method of embodiment 0, wherein determining whether the TDRA list is for transmitting on the uplink using PUSCH repetition or TBoMS is based respectively on whether a format of the TDRA list complies with a PUSCH repetition-specific TDRA list definition or a TBoMS-specific TDRA list definition that is independent of the PUSCH repetition-specific TDRA list definition.

Embodiment 12. The method of embodiment 0, wherein determining whether the TDRA list is for transmitting on the uplink using PUSCH repetition or TBoMS comprises identifying whether to use a PUSCH repetition Time Domain Allocation (TDA) list or a TBoMS TDA list, respectively, for PUSCH scheduling.

Embodiment 13. The method of embodiment 0, wherein identifying whether to use the PUSCH repetition TDA list or the TBoMS TDA list for PUSCH scheduling is based on which of a plurality of DCI formats is used to schedule the uplink.

Embodiment 14. A wireless device configured to:

determine whether a Time Domain Resource Allocation (TDRA) list is for transmitting on an uplink using Physical Uplink Shared Channel (PUSCH) repetition or Transport Block processing over Multi-Slot PUSCH (TBoMS); and transmit on the uplink in accordance with the determination.

Embodiment 15. The wireless device of the preceding embodiment, further configured to perform the method of any one of embodiments 0-0.

Embodiment 16. A wireless device comprising:

processing circuitry and memory circuitry, the memory circuitry containing instructions executable by the processing circuitry whereby the wireless device is configured to:

determine whether a Time Domain Resource Allocation (TDRA) list is for transmitting on an uplink using Physical Uplink Shared Channel (PUSCH) repetition or Transport Block processing over Multi-Slot PUSCH (TBoMS); and transmit on the uplink in accordance with the determination.

Embodiment 17. The wireless device of the preceding embodiment, wherein the wireless device is further configured to perform the method of any one of embodiments 0-0.

Embodiment 18. A computer program, comprising instructions which, when executed on processing circuitry of a wireless device, cause the processing circuitry to carry out the method according to any one of embodiments 0-0.

Embodiment 19. A carrier containing the computer program of the preceding embodiment, wherein the carrier is one of an electronic signal, optical signal, radio signal, or computer readable storage medium.

Embodiment 20. A method, implemented by a network node, the method comprising:

indicating, to a wireless device, whether a Time Domain Resource Allocation (TDRA) list is for transmitting on an uplink using Physical Uplink Shared Channel (PUSCH) repetition or Transport Block processing over Multi-Slot PUSCH (TBOMS); and receiving a transmission on the uplink from the wireless device in accordance with the TDRA list.

Embodiment 21. The method of embodiment 0, wherein the indicating comprises transmitting an explicit indication of whether the TDRA list is for PUSCH repetition or TBoMS via Radio Resource Control (RRC) or Downlink Control Information (DCI) signaling.

Embodiment 22. The method of embodiment 0, wherein the explicit indication indicates that TBoMS is enabled and how many slots are configured per TBoMS transmission.

Embodiment 23. The method of embodiment 0, wherein the indicating comprises:

including, in a field of the TDRA list, an indication of a number of repetitions or a number of allocated slots depending respectively on whether the TDRA list is for PUSCH repetition or for TBoMS; and transmitting the TDRA list to the wireless device.

Embodiment 24. The method of embodiment 0, wherein the indicating comprises including, in a number of slots field in the TDRA list, a value of one slot and transmitting the TDRA list to the wireless device.

Embodiment 25. The method of embodiment 0, wherein the indicating comprises including, in a number of slots field in the TDRA list, a value of more than one slot and transmitting the TDRA list to the wireless device.

Embodiment 26. The method of embodiment 0, wherein the indicating comprises:

omitting or including, in the TDRA list, a number of slots field to indicate that the TDRA list is for transmitting on the uplink using PUSCH repetition or TBoMS, respectively; and transmitting the TDRA list to the wireless device.

Embodiment 27. The method of embodiment 0, further comprising transmitting the TDRA list to the wireless device in compliance with either a first release-specific definition or a second release-specific definition to indicate that the TDRA list is for transmitting on the uplink using PUSCH repetition or TBoMS, respectively.

Embodiment 28. The method of embodiment 0, wherein the indicating comprises including, in the TDRA list, a Type A PUSCH repetition configuration having a repetition factor greater than or equal to one and transmitting the TDRA list to the wireless device.

Embodiment 29. The method of embodiment 0, wherein the indicating comprises transmitting, to the wireless device, the TDRA list in compliance with a PUSCH repetition-specific TDRA list definition or a TBoMS-specific TDRA list definition that is independent of the PUSCH repetition-specific TDRA list definition to indicate that the TDRA list is for transmitting on the uplink using PUSCH repetition or TBoMS, respectively.

Embodiment 30. The method of embodiment 0, wherein the indicating comprises transmitting, to the wireless device, a PUSCH repetition Time Domain Allocation (TDA) list or a TBoMS TDA list for PUSCH scheduling to indicate that the TDRA list is for transmitting on the uplink using PUSCH repetition or TBoMS, respectively.

Embodiment 31. The method of embodiment 0, further comprising scheduling the uplink using a selected one of a plurality of DCI formats, the wherein the selected DCI format identifies whether to use the PUSCH repetition TDA list or the TBoMS TDA list to determine whether the TDRA list is for transmitting on the uplink using PUSCH scheduling or TBoMS.

Embodiment 32. A network node configured to:

indicate, to a wireless device, whether a Time Domain Resource Allocation (TDRA) list is for transmitting on an uplink using Physical Uplink Shared Channel (PUSCH) repetition or Transport Block processing over Multi-Slot PUSCH (TBOMS); and receive a transmission on the uplink from the wireless device in accordance with the TDRA list.

Embodiment 33. The network node of the preceding embodiment, further configured to perform the method of any one of embodiments 0-0.

Embodiment 34. A network node comprising:

processing circuitry and memory circuitry, the memory circuitry containing instructions executable by the processing circuitry whereby the wireless device is configured to:

indicate, to a wireless device, whether a Time Domain Resource Allocation (TDRA) list is for transmitting on an uplink using Physical Uplink Shared Channel (PUSCH) repetition or Transport Block processing over Multi-Slot PUSCH (TBOMS); and receive a transmission on the uplink from the wireless device in accordance with the TDRA list.

Embodiment 35. The network node of the preceding embodiment, wherein the wireless device is further configured to perform the method of any one of embodiments 0-0.

Embodiment 36. A computer program, comprising instructions which, when executed on processing circuitry of a network node, cause the processing circuitry to carry out the method according to any one of embodiments 0-0.

Embodiment 37. A carrier containing the computer program of the preceding embodiment, wherein the carrier is one of an electronic signal, optical signal, radio signal, or computer readable storage medium.

ADDITIONAL ENUMERATED EMBODIMENTS

The enumerated embodiments recited herein may be grouped as follows:

Group A includes embodiments 1-12 (above), and 38 (below).

Group B includes embodiments 20-31 (above), and 39 (below).

Group C includes embodiments 40 and above (below).

Additional enumerated embodiments include:

Embodiment 1. The method of any of the Group A embodiments, further comprising providing user data; and forwarding the user data to a host via the transmission to the network node.

Embodiment 2. The method of any of the Group B embodiments, further comprising obtaining user data; and forwarding the user data to a host or a user equipment.

Group C Embodiments

Embodiment 1. A user equipment for transmitting on an uplink, comprising:

processing circuitry configured to perform any of the steps of any of the Group A embodiments; and power supply circuitry configured to supply power to the processing circuitry.

Embodiment 2. A network node for configuring an uplink, the network node comprising:

processing circuitry configured to perform any of the steps of any of the Group B embodiments;

power supply circuitry configured to supply power to the processing circuitry.

Embodiment 3. A user equipment (UE) for transmitting on an uplink, the UE comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

Embodiment 4. A host configured to operate in a communication system to provide an over-the-top (OTT) service, the host comprising:

processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A embodiments to receive the user data from the host.

Embodiment 5. The host of the previous embodiment, wherein the cellular network further includes a network node configured to communicate with the UE to transmit the user data to the UE from the host.

Embodiment 6. The host of the previous 2 embodiments, wherein:

the processing circuitry of the host is configured to execute a host application, thereby providing the user data; and the host application is configured to interact with a client application executing on the UE, the client application being associated with the host application.

Embodiment 7. A method implemented by a host operating in a communication system that further includes a network node and a user equipment (UE), the method comprising:

providing user data for the UE; and initiating a transmission carrying the user data to the UE via a cellular network comprising the network node, wherein the UE performs any of the operations of any of the Group A embodiments to receive the user data from the host.

Embodiment 8. The method of the previous embodiment, further comprising at the host, executing a host application associated with a client application executing on the UE to receive the user data from the UE.

Embodiment 9. The method of the previous embodiment, further comprising:

at the host, transmitting input data to the client application executing on the UE, the input data being provided by executing the host application, wherein the user data is provided by the client application in response to the input data from the host application.

Embodiment 10. A host configured to operate in a communication system to provide an over-the-top (OTT) service, the host comprising:

processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A embodiments to transmit the user data to the host.

Embodiment 11. The host of the previous embodiment, wherein the cellular network further includes a network node configured to communicate with the UE to transmit the user data from the UE to the host.

Embodiment 12. The host of the previous 2 embodiments, wherein:

the processing circuitry of the host is configured to execute a host application, thereby providing the user data; and the host application is configured to interact with a client application executing on the UE, the client application being associated with the host application.

Embodiment 13. A method implemented by a host configured to operate in a communication system that further includes a network node and a user equipment (UE), the method comprising, at the host, receiving user data transmitted to the host via the network node by the UE, wherein the UE performs any of the steps of any of the Group A embodiments to transmit the user data to the host.

Embodiment 14. The method of the previous embodiment, further comprising, at the host, executing a host application associated with a client application executing on the UE to receive the user data from the UE.

Embodiment 15. The method of the previous embodiment, further comprising:

at the host, transmitting input data to the client application executing on the UE, the input data being provided by executing the host application, wherein the user data is provided by the client application in response to the input data from the host application.

Embodiment 16. A host configured to operate in a communication system to provide an over-the-top (OTT) service, the host comprising:

processing circuitry configured to provide user data; and a network interface configured to initiate transmission of the user data to a network node in a cellular network for transmission to a user equipment (UE), the network node having a communication interface and processing circuitry, the processing circuitry of the network node configured to perform any of the operations of any of the Group B embodiments to transmit the user data from the host to the UE.

Embodiment 17. The host of the previous embodiment, wherein:

the processing circuitry of the host is configured to execute a host application that provides the user data; and the UE comprises processing circuitry configured to execute a client application associated with the host application to receive the transmission of user data from the host.

Embodiment 18. A method implemented in a host configured to operate in a communication system that further includes a network node and a user equipment (UE), the method comprising:

providing user data for the UE; and initiating a transmission carrying the user data to the UE via a cellular network comprising the network node, wherein the network node performs any of the operations of any of the Group B embodiments to transmit the user data from the host to the UE.

Embodiment 19. The method of the previous embodiment, further comprising, at the network node, transmitting the user data provided by the host for the UE.

Embodiment 20. The method of any of the previous 2 embodiments, wherein the user data is provided at the host by executing a host application that interacts with a client application executing on the UE, the client application being associated with the host application.

Embodiment 21. A communication system configured to provide an over-the-top service, the communication system comprising:

a host comprising:

processing circuitry configured to provide user data for a user equipment (UE), the user data being associated with the over-the-top service; and a network interface configured to initiate transmission of the user data toward a cellular network node for transmission to the UE, the network node having a communication interface and processing circuitry, the processing circuitry of the network node configured to perform any of the operations of any of the Group B embodiments to transmit the user data from the host to the UE.

Embodiment 22. The communication system of the previous embodiment, further comprising:

the network node; and/or the user equipment.

Embodiment 23. A host configured to operate in a communication system to provide an over-the-top (OTT) service, the host comprising:

processing circuitry configured to initiate receipt of user data; and a network interface configured to receive the user data from a network node in a cellular network, the network node having a communication interface and processing circuitry, the processing circuitry of the network node configured to perform any of the operations of any of the Group B embodiments to receive the user data from a user equipment (UE) for the host.

Embodiment 24. The host of the previous 2 embodiments, wherein:

the processing circuitry of the host is configured to execute a host application, thereby providing the user data; and the host application is configured to interact with a client application executing on the UE, the client application being associated with the host application.

Embodiment 25. The host of the any of the previous 2 embodiments, wherein the initiating receipt of the user data comprises requesting the user data.

Embodiment 26. A method implemented by a host configured to operate in a communication system that further includes a network node and a user equipment (UE), the method comprising, at the host, initiating receipt of user data from the UE, the user data originating from a transmission which the network node has received from the UE, wherein the network node performs any of the steps of any of the Group B embodiments to receive the user data from the UE for the host.

Embodiment 27. The method of the previous embodiment, further comprising at the network node, transmitting the received user data to the host.

The invention claimed is:

1. A method, implemented in a wireless device, the method comprising:

determining whether an uplink transmission is for Physical Uplink Shared Channel (PUSCH) repetition or Transport Block processing over Multi-Slot PUSCH (TBOMS) based on a field in a Time Domain Resource Allocation (TDRA) list, wherein the TDRA list comprises separate fields for a number of slots and a number of repetitions, regardless of whether the uplink transmission is for PUSCH repetition or TBoMS, and wherein when the number of slots is 1 for a given entry in the TDRA list, the number of repetitions for the given entry in the TDRA list is restrained to 1; and transmitting the uplink transmission in accordance with the determination.

2. The method of claim 1, wherein the TDRA list is defined for PUSCH repetition and TBoMS.

3. The method of claim 1, wherein determining whether the uplink transmission is for PUSCH repetition or TBoMS comprises determining that the uplink transmission is for PUSCH repetition responsive to the field for the number of slots in the TDRA list having a value that indicates one slot.

4. The method of claim 1, wherein determining whether the uplink transmission is for PUSCH repetition or TBoMS comprises determining that the uplink transmission is for TBoMS responsive to the field for the number of slots in the TDRA list having a value that indicates more than one slot.

5. The method of claim 4, wherein when it is determined that the uplink transmission is for TBoMS, determining the number of repetitions to be used for the TBoMS according to the value of the field for the number of repetitions.

6. The method of claim 1, wherein the wireless device support for enhanced Type A PUSCH repetition and TBoMS are independent from each other.

7. The method of claim 1, wherein TBoMS transmissions are not supported in unlicensed spectrum.

8. The method of claim 1, wherein the PUSCH repetition comprises one or more repetitions of a single-slot transport block.

9. The method of claim 1, wherein the TBoMS extends the time domain resource for the transmission of a transport block across a slot border.

10. A wireless device comprising:

processing circuitry and memory circuitry, the memory circuitry containing instructions executable by the processing circuitry whereby the wireless device is configured to:

determine whether an uplink transmission is for Physical Uplink Shared Channel (PUSCH) repetition or Transport Block processing over Multi-Slot PUSCH (TBoMS) based on a field in a Time Domain Resource Allocation (TDRA) list, wherein the TDRA list comprises separate fields for a number of slots and a number of repetitions, regardless of whether the uplink transmission is for PUSCH repetition or TBoMS, and wherein when the number of slots is 1 for a given entry in the TDRA list, the number of repetitions for the given entry in the TDRA list is restrained to 1; and transmit the uplink transmission in accordance with the determination.

11. A method, implemented by a network node, the method comprising:

indicating, to a wireless device, whether an uplink transmission is for Physical Uplink Shared Channel (PUSCH) repetition or Transport Block processing over Multi-Slot PUSCH (TBoMS) based on a field in a Time Domain Resource Allocation (TDRA) list, wherein the TDRA list comprises separate fields for a number of slots and a number of repetitions, regardless of whether the uplink transmission is for PUSCH repetition or TBoMS, and wherein when the number of slots is 1 for a given entry in the TDRA list, the number of repetitions for the given entry in the TDRA list is restrained to 1; and receiving the uplink transmission from the wireless device in accordance with the indication.

12. The method of claim 11, wherein the TDRA list is defined for PUSCH repetition and TBoMS.

13. The method of claim 11, wherein the TDRA list comprises separate fields for the number of slots and the number of repetitions, regardless of whether the uplink transmission is for PUSCH repetition or TBOMS.

14. The method of claim 11, wherein:

the indicating comprises including, in a number of slots field in the TDRA list, a value that indicates one slot or a value that indicates more than one slot, and transmitting the TDRA list to the wireless device;

the value that indicates one slot indicates that the uplink transmission is for PUSCH repetition; and the value that indicates more than one slot indicates that the uplink transmission is for TBOMS.

15. The method of claim 14, wherein when it is indicated that the uplink transmission is for PUSCH repetition, the method further comprises indicating a number of repetitions to be used for the PUSCH repetition according to the value of the field for the number of repetitions.

16. The method of claim 14, wherein when it is indicated that the uplink transmission is for TBoMS, the method further comprises indicating a number of repetitions to be used for the TBoMS according to the value of the field for the number of repetitions.

17. The method of claim 11, wherein the PUSCH repetition comprises one or more repetitions of a single-slot transport block.

18. The method of claim 11, wherein the TBoMS extends the time domain resource for the transmission of a transport block across a slot border.

19. A network node comprising:

processing circuitry and memory circuitry, the memory circuitry containing instructions executable by the processing circuitry whereby the network node is configured to:

indicate, to a wireless device, whether an uplink transmission is for Physical Uplink Shared Channel (PUSCH) repetition or Transport Block processing over Multi-Slot PUSCH (TBoMS) based on a field in a Time Domain Resource Allocation (TDRA) list, wherein the TDRA list comprises separate fields for a number of slots and a number of repetitions, regardless of whether the uplink transmission is for PUSCH repetition or TBoMS, and wherein when the number of slots is 1 for a given entry in the TDRA list, the number of repetitions for the given entry in the TDRA list is restrained to 1; and receive the uplink transmission from the wireless device in accordance with the indication.

* * * * *